(12) United States Patent
Smith et al.

(10) Patent No.: US 7,922,827 B2
(45) Date of Patent: *Apr. 12, 2011

(54) CLEANING COMPOSITIONS CONTAINING WATER SOLUBLE MAGNESIUM COMPOUNDS AND METHODS OF USING THEM

(75) Inventors: Kim R. Smith, Woodbury, MN (US); Michael E. Besse, Golden Valley, MN (US); Brenda L. Tjelta, St. Paul, MN (US); Lisa M. Sanders, Eagan, MN (US); Keith E. Olson, Apple Valley, MN (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/785,867

(22) Filed: May 24, 2010

(65) Prior Publication Data
US 2010/0234262 A1 Sep. 16, 2010

Related U.S. Application Data

(63) Continuation of application No. 12/114,513, filed on May 2, 2008, now Pat. No. 7,749,329.

(60) Provisional application No. 60/927,575, filed on May 4, 2007.

(51) Int. Cl.
*B08B 7/04* (2006.01)
(52) U.S. Cl. ....... 134/18; 134/25.1; 134/25.2; 134/25.3; 134/36; 134/42; 510/108; 510/220; 510/225
(58) Field of Classification Search .................. 134/18, 134/25.1, 25.2, 25.3, 36, 42; 510/108, 220, 510/225
See application file for complete search history.

(56) References Cited

U.S. PATENT DOCUMENTS

| | | |
|---|---|---|
| 3,931,031 A | 1/1976 | Willard, Sr. |
| 4,036,749 A | 7/1977 | Anderson |
| 4,038,430 A | 7/1977 | Drake et al. |
| 4,150,001 A | 4/1979 | Sen |
| 4,435,307 A | 3/1984 | Barbesgaard et al. |
| 4,443,270 A | 4/1984 | Biard et al. |
| 4,678,685 A | 7/1987 | Hasson et al. |
| 4,713,159 A | 12/1987 | Truitt et al. |
| 4,820,439 A | 4/1989 | Rieck |
| 4,844,828 A | 7/1989 | Aoki |
| 4,908,148 A | 3/1990 | Caravajal et al. |

(Continued)

FOREIGN PATENT DOCUMENTS
EP 0008211 B1 12/1981
(Continued)

OTHER PUBLICATIONS

Author Unknown, "Introducing Revolutionary Nano-Crystal Technology for Eliminating Scale," ScaleX2—Revolutionary Scale Prevention Technology, OptiPure, http://www.optipurewater.com/Downloads/Other_downloads/SX2Techbro.pdf.

(Continued)

*Primary Examiner* — Sharidan Carillo
(74) *Attorney, Agent, or Firm* — Andrew D. Sorensen; Laura C. DiLorenzo

(57) ABSTRACT

The present invention relates to cleaning compositions and methods employing a water soluble magnesium compound. Such compositions can be used for reducing scale, rinsing, hard surface cleaning, ware washing, and corrosion inhibition.

11 Claims, 16 Drawing Sheets

U.S. PATENT DOCUMENTS

| | | | |
|---|---|---|---|
| 4,917,812 A | 4/1990 | Cilley | |
| 4,966,606 A | 10/1990 | Garner-Gray et al. | |
| 5,182,028 A | 1/1993 | Boffardi et al. | |
| 5,277,823 A | 1/1994 | Hann et al. | |
| 5,308,403 A | 5/1994 | Yam et al. | |
| 5,364,551 A | 11/1994 | Lentsch et al. | |
| 5,376,310 A | 12/1994 | Cripe et al. | |
| 5,407,471 A | 4/1995 | Rohr et al. | |
| 5,540,866 A | 7/1996 | Aszman et al. | |
| 5,624,892 A | 4/1997 | Angevaare et al. | |
| 5,698,506 A | 12/1997 | Angevaare et al. | |
| 5,733,865 A | 3/1998 | Pancheri et al. | |
| 5,783,539 A | 7/1998 | Angevaare et al. | |
| 5,863,877 A * | 1/1999 | Carr et al. | 510/348 |
| 5,874,397 A | 2/1999 | Schimmel et al. | |
| 5,879,562 A | 3/1999 | Garbutt | |
| 5,993,737 A | 11/1999 | Mackintosh et al. | |
| 6,083,894 A | 7/2000 | Keyes et al. | |
| 6,221,146 B1 | 4/2001 | Fortier et al. | |
| 6,299,701 B1 | 10/2001 | Aubay et al. | |
| 6,365,101 B1 | 4/2002 | Nguyen et al. | |
| 6,402,824 B1 | 6/2002 | Freeman et al. | |
| 6,448,210 B1 | 9/2002 | Keyes et al. | |
| 6,622,736 B1 | 9/2003 | Hahn | |
| 6,652,747 B2 | 11/2003 | Hvarre | |
| 6,685,908 B1 | 2/2004 | Yaniv | |
| 6,686,325 B2 | 2/2004 | Hoyt et al. | |
| 6,693,071 B2 | 2/2004 | Ghosh et al. | |
| 6,694,989 B2 | 2/2004 | Everson et al. | |
| 6,777,384 B2 | 8/2004 | Raths et al. | |
| 6,794,345 B2 | 9/2004 | Elsner et al. | |
| 6,806,245 B2 | 10/2004 | Hahn | |
| 6,815,410 B2 | 11/2004 | Boutique et al. | |
| 6,835,702 B2 | 12/2004 | Herdt et al. | |
| 6,881,713 B2 | 4/2005 | Sommerville-Roberts et al. | |
| 6,916,777 B2 | 7/2005 | Connor et al. | |
| 6,992,052 B2 | 1/2006 | Song | |
| 7,026,278 B2 | 4/2006 | Price et al. | |
| 7,033,980 B2 | 4/2006 | Waits et al. | |
| 7,063,895 B2 | 6/2006 | Rodrigues et al. | |
| 7,077,963 B2 | 7/2006 | McConchie et al. | |
| 7,087,662 B2 | 8/2006 | Ghosh et al. | |
| 7,094,740 B2 | 8/2006 | Berger et al. | |
| 7,101,833 B2 | 9/2006 | Berger et al. | |
| 7,135,448 B2 | 11/2006 | Lentsch et al. | |
| 7,153,816 B2 | 12/2006 | Kessler et al. | |
| 7,241,726 B2 | 7/2007 | Song et al. | |
| 7,273,558 B2 | 9/2007 | Miecznik | |
| 7,320,957 B2 | 1/2008 | Brooker et al. | |
| 2002/0111285 A1 | 8/2002 | Price et al. | |
| 2002/0172773 A1 | 11/2002 | Ghosh et al. | |
| 2003/0008794 A1 | 1/2003 | Jaynes | |
| 2003/0008801 A1 | 1/2003 | Raths et al. | |
| 2003/0050205 A1 | 3/2003 | Hahn | |
| 2003/0073596 A1 | 4/2003 | Chiou et al. | |
| 2003/0078176 A1 | 4/2003 | Elsner et al. | |
| 2003/0111097 A1 | 6/2003 | Everson et al. | |
| 2003/0166492 A1 | 9/2003 | Holderbaum et al. | |
| 2003/0166493 A1 | 9/2003 | Holderbaum et al. | |
| 2004/0034905 A1 | 2/2004 | Underwood et al. | |
| 2004/0048760 A1 | 3/2004 | Rabon et al. | |
| 2004/0058846 A1 | 3/2004 | Kistenmacher et al. | |
| 2004/0121926 A1 | 6/2004 | Waits et al. | |
| 2004/0147427 A1 | 7/2004 | Waits et al. | |
| 2004/0162226 A1 | 8/2004 | Sunder et al. | |
| 2004/0167048 A1 | 8/2004 | Sunder et al. | |
| 2004/0176264 A1 | 9/2004 | Song et al. | |
| 2004/0176269 A1 | 9/2004 | Song | |
| 2004/0180807 A1 | 9/2004 | Song et al. | |
| 2004/0220068 A1 | 11/2004 | Hahn | |
| 2004/0259751 A1 | 12/2004 | Kessler et al. | |
| 2005/0003979 A1 | 1/2005 | Lentsch et al. | |
| 2005/0020464 A1 | 1/2005 | Smith et al. | |
| 2005/0075258 A1* | 4/2005 | Kessler et al. | 510/221 |
| 2005/0087213 A1 | 4/2005 | Hahn | |
| 2005/0113271 A1 | 5/2005 | Pegelow et al. | |
| 2005/0119150 A1 | 6/2005 | Pegelow et al. | |
| 2005/0119154 A1 | 6/2005 | Song et al. | |
| 2005/0137106 A1 | 6/2005 | Song et al. | |
| 2005/0143278 A1 | 6/2005 | Pegelow et al. | |
| 2005/0143280 A1 | 6/2005 | Nelson et al. | |
| 2005/0148479 A1 | 7/2005 | Barthel et al. | |
| 2005/0148488 A1 | 7/2005 | Jekel et al. | |
| 2005/0153868 A1 | 7/2005 | Berger et al. | |
| 2005/0155131 A1 | 7/2005 | Underwood et al. | |
| 2005/0181962 A1 | 8/2005 | Pegelow et al. | |
| 2005/0187136 A1 | 8/2005 | Pegelow et al. | |
| 2005/0187137 A1 | 8/2005 | Pegelow et al. | |
| 2005/0225003 A1 | 10/2005 | Holderbaum et al. | |
| 2005/0233925 A1 | 10/2005 | Foley et al. | |
| 2005/0239680 A1 | 10/2005 | Buchmeier et al. | |
| 2005/0253116 A1 | 11/2005 | Hahn | |
| 2005/0261156 A1 | 11/2005 | Kottwitz et al. | |
| 2005/0261158 A1 | 11/2005 | Kottwitz et al. | |
| 2006/0030506 A1 | 2/2006 | Song et al. | |
| 2006/0035807 A1 | 2/2006 | Kasturi et al. | |
| 2006/0046954 A1 | 3/2006 | Smith et al. | |
| 2006/0069001 A1 | 3/2006 | Song | |
| 2006/0069002 A1 | 3/2006 | Song et al. | |
| 2006/0069003 A1 | 3/2006 | Song et al. | |
| 2006/0069004 A1 | 3/2006 | Song et al. | |
| 2006/0069005 A1 | 3/2006 | Song | |
| 2006/0075576 A1 | 4/2006 | Price et al. | |
| 2006/0079430 A1 | 4/2006 | Berger et al. | |
| 2006/0079437 A1 | 4/2006 | Kondo et al. | |
| 2006/0089294 A1 | 4/2006 | Depoot et al. | |
| 2006/0094634 A1 | 5/2006 | Jekel et al. | |
| 2006/0116304 A1 | 6/2006 | McRitchie et al. | |
| 2006/0116309 A1 | 6/2006 | Lambotte et al. | |
| 2006/0122089 A1 | 6/2006 | Lambotte et al. | |
| 2006/0123852 A1 | 6/2006 | Wiedemann et al. | |
| 2006/0128602 A1 | 6/2006 | Lentsch et al. | |
| 2006/0135394 A1 | 6/2006 | Smith et al. | |
| 2006/0157084 A1 | 7/2006 | Wiedemann et al. | |
| 2006/0189508 A1 | 8/2006 | Brooker et al. | |
| 2006/0194708 A1 | 8/2006 | Barthel et al. | |
| 2006/0199750 A1 | 9/2006 | Berger et al. | |
| 2006/0217286 A1 | 9/2006 | Geoffroy et al. | |
| 2006/0223734 A1 | 10/2006 | Bayersdoerfer et al. | |
| 2006/0223738 A1 | 10/2006 | Holderbaum et al. | |
| 2006/0234900 A1 | 10/2006 | Olson et al. | |
| 2006/0258556 A1 | 11/2006 | Holderbaum et al. | |
| 2006/0270580 A1 | 11/2006 | Smith et al. | |
| 2007/0017553 A1 | 1/2007 | Neplenbroek et al. | |
| 2008/0020960 A1* | 1/2008 | Smith et al. | 510/267 |
| 2008/0234164 A1 | 9/2008 | Tyborski | |
| 2008/0274928 A1 | 11/2008 | Smith et al. | |
| 2008/0274930 A1 | 11/2008 | Smith et al. | |
| 2008/0274932 A1 | 11/2008 | Smith et al. | |
| 2008/0274933 A1 | 11/2008 | Fernholz et al. | |
| 2008/0274939 A1 | 11/2008 | Monsrud et al. | |
| 2008/0276967 A1 | 11/2008 | Smith et al. | |
| 2008/0280800 A1 | 11/2008 | Smith et al. | |
| 2008/0287335 A1 | 11/2008 | Smith | |
| 2008/0300160 A1 | 12/2008 | Smith et al. | |
| 2009/0054287 A1 | 2/2009 | Smith et al. | |
| 2009/0054290 A1 | 2/2009 | Fernholz et al. | |

FOREIGN PATENT DOCUMENTS

| | | |
|---|---|---|
| EP | 0241962 | 5/1990 |
| EP | 303761 | 9/1992 |
| EP | 0406662 | 3/1995 |
| EP | 130756 | 6/2000 |
| EP | 0828812 | 10/2001 |
| EP | 1253188 | 10/2002 |
| GB | 784750 | 12/1957 |
| GB | 1437950 | 6/1976 |
| JP | 4104885 | 4/1992 |
| JP | 10118638 | 5/1998 |
| JP | 2003-525104 | 8/2003 |
| JP | 2007-292389 | 11/2007 |
| KR | 810000367 | 4/1981 |
| KR | 10-2004-0019262 | 3/2004 |
| KR | 10-2006-0003294 | 1/2006 |
| WO | WO92/03529 | 3/1992 |
| WO | WO93/18140 | 9/1993 |
| WO | WO94/25583 | 11/1994 |

| | | |
|---|---|---|
| WO | WO95/07791 | 3/1995 |
| WO | WO95/10591 | 4/1995 |
| WO | WO95/10615 | 4/1995 |
| WO | WO95/29979 | 11/1995 |
| WO | WO95/30010 | 11/1995 |
| WO | WO95/30011 | 11/1995 |
| WO | WO98/40455 | 9/1998 |
| WO | WO2006/128498 | 12/2006 |

OTHER PUBLICATIONS

Berner, R.A., "The Role of Magnesium in the Crystal Growth of Calcite and Aragonite from Sea Water," Geochimica et Cosmochimica Acta, vol. 39, Issue 4, Apr. 1975, pp. 489-494.

Bischoff, J.L. and Fyfe, W.S., "Catalysis, Inhibition, and the Calcite-Aragonite Problem," American Journal of Science, vol. 266, Feb. 1968, pp. 65-79.

Gibson, Aileen and Maniocha, Michael, "The Use of Magnesium Hydroxide Slurry for Biological Treatment of Municipal and Industrial Wastewater," Martin Marietta Magnesia Specialties, LLC, white paper, 7 pgs.

Kawaguchi, H. et al., "Crystallization of Inorganic Compounds in Polymer Solutions. Part I: Control of Shape and Form of Calcium Carbonate," Colloid Polym Sci, vol. 270, 1992, pp. 1176-1181.

Lee, Inhyung et al., "Nanoparticle-Directed Crystallization of Calcium Carbonate," Advanced Materials, Jul. 3, 2001, 4 pgs.

Loste, Eva et al., "The role of magnesium in stabilizing amorphous calcium carbonate and controlling calcite morpologies", Journal of Crystal Growth 254 (2003), pp. 206-218.

Meyer, H.J., "The Influence of Impurities on the Grown Rate of Calcite," Journal of Crystal Growth, vol. 66, 1984, pp. 639-646.

Takayuki, Saito and Takuhisa, Handa, "Improvement in the Water Recovery and Scale Prevention of an RO System," Ebara Engineering Review, vol. 199, 2003, pp. 30-34.

Woon-Kyoung Park, "Crystal Growth of Aragonite Precipitated Calcium Carbonate by Seeded Method,", Materials Science Forum vols. 544-545 (2007) pp. 693-696.

* cited by examiner

0 = clear after 2 minutes mixing
1 = slightly hazey
2 = hazey
3 = definite precipitate 0 = clear after 2 minutes mixing
1 = slightly hazey
2 = hazey
3 = definite precipitate 0 = clear after 2 minutes mixing
1 = slightly hazey
2 = hazey
3 = definite precipitate

CLEANING COMPOSITIONS CONTAINING WATER SOLUBLE MAGNESIUM COMPOUNDS AND METHODS OF USING THEM

CROSS-REFERENCE TO RELATED APPLICATION

This application is a continuation application of U.S. patent application Ser. No. 12/114,513, filed on May 2, 2008, now issued as U.S. Pat. No. 7,749,329, which claims priority to U.S. Provisional Application Ser. No. 60/927,575, filed on May 4, 2007, entitled "Compositions Containing Magnesium Salt and Methods of Using", the disclosures of which are incorporated herein by reference.

U.S. patent application Ser. No. 12/114,513 is also related to: U.S. patent application Ser. No. 12/114,329, entitled "Compositions Including CA and MG Ions and Gluconate and Methods Employing Them to Reduce Corrosion and Etch", now issued as U.S. Pat. No. 7,709,434; U.S. patent application Ser. No. 12/114,486, entitled "Cleaning Compositions with Water Insoluble Conversion Agents and Methods of Making and Using Them"; U.S. patent application Ser. No. 12/114,355, entitled, "Composition for In Situ Manufacture of Insoluble Hydroxide when Cleaning Hard Surfaces and for Use In Automatic Warewashing Machines, and Methods for Manufacturing And Using"; U.S. patent application Ser. No. 12/114,448, entitled "Water Treatment System and Downstream Cleaning Methods"; U.S. patent application Ser. No. 12/114,327, entitled "Water Soluble Magnesium Compounds as Cleaning Agents and Methods of Using Them"; U.S. patent application Ser. No. 12/114,428, entitled "MG++ Chemistry and Method for Fouling Inhibition in Heat Processing of Liquid Foods and Industrial Processes"; U.S. patent application Ser. No. 12/114,342, entitled "Compositions Including Hardness Ion and Silicate and Methods Employing Them to Reduce Corrosion and Etch"; U.S. patent application Ser. No. 12/114,364, entitled "Compositions Including Hardness Ion and Threshold Agent and Methods Employing Them to Reduce Corrosion and Etch"; U.S. patent application Ser. No. 12/114,385, entitled "Warewashing Compositions for Use in Automatic Dishwashing Machines and Method for Using", filed on May 2, 2008; and U.S. patent application Ser. No. 12/262,627, entitled "MG++ Chemistry and Method for Fouling Inhibition In Heat Processing of Liquid Foods and Industrial Processes"; U.S. patent application Ser. No. 12/263,156, entitled "Cleaning Compositions with Water Insoluble Conversion Agents and Methods of Making and Using Them"; U.S. patent application Ser. No. 12/263,090, entitled "Cleaning Compositions Containing Water Soluble Magnesium Compounds and Methods of Using Them", now issued as U.S. Pat. No. 7,828,905; and U.S. patent application Ser. No. 12/263,021, entitled "Compositions Including Hardness Ions and Gluconate and Methods Employing Them to Reduce Corrosion and Etch", now issued as U.S. Pat. No. 7,741,262, filed on Oct. 31, 2008; and U.S. patent application Ser. No. 12/726,179, entitled "Compositions Including Hardness Ions and Gluconate and Methods Employing Them to Reduce Corrosion and Etch", filed on Mar. 17, 2010, now allowed, all commonly assigned to Ecolab Inc., and are all incorporated herein by reference for all purposes.

FIELD OF THE INVENTION

The present invention relates to compositions and methods employing a water soluble magnesium compound. The present composition can be substantially free of chelating agent, threshold agent or sequestrant. The methods and compositions can provide magnesium ion at predefined ratios to calcium ion in water, such as magnesium ion in a molar amount equal to or in excess over a molar amount of calcium ion. These compositions can be used for reducing scale, rinsing, hard surface cleaning, and ware washing. These compositions can also be used to reduce ash build up in laundry cleaning processes.

BACKGROUND OF THE INVENTION

The level of hardness in water can have a deleterious effect in many systems. For example, when hard water alone, or in conjunction with cleaning compositions, contacts a surface, it can cause precipitation of hard water scale on the contacted surface. In general, hard water refers to water having a total level of calcium and magnesium ions in excess of about 100 ppm expressed in units of ppm calcium carbonate. Often, the molar ratio of calcium to magnesium in hard water is about 2:1 or about 3:1. Although most locations have hard water, water hardness tends to vary from one location to another.

Water hardness has been addressed in a number of ways. One method currently used to soften water is via ion exchange, e.g., by adding sodium to the water to exchange the calcium and magnesium ions in the water with sodium associated with a resin bed in a water softening unit. The calcium and magnesium adhere to a resin in the softener. When the resin becomes saturated it is necessary to regenerate it using large amounts of sodium chloride dissolved in water. The sodium displaces the calcium and magnesium, which is flushed out in a briny solution along with the chloride from the added sodium chloride. When water softeners regenerate they produce a waste stream that contains significant amounts of chloride, creating a burden on the system, e.g., sewer system, in which they are disposed of, including a multitude of downstream water re-use applications like potable water usages and agriculture.

Hard water is also known to reduce the efficacy of detergents. One method for counteracting this includes adding chelating agents or sequestrants into detersive compositions that are intended to be mixed with hard water in an amount sufficient to handle the hardness. However, in many instances the water hardness exceeds the chelating capacity of the composition. As a result, free calcium ions may be available to attack active components of the composition, to cause corrosion or precipitation, or to cause other deleterious effects, such as poor cleaning effectiveness or lime scale build up.

SUMMARY OF THE INVENTION

In some aspects, the present invention relates to methods and compositions that employ a water soluble magnesium salt to counter the undesirable effects of calcium ion in hard water. In some embodiments of the present invention, water soluble magnesium salt is used in cleaning compositions as a replacement for substantial levels of a conventional builder, chelating agent, sequestrant, and threshold agent.

In some embodiments, the compositions of the present invention include water soluble magnesium compound as a substitute for significant amount of or all of the conventional builder, chelating agent, sequestrant, or threshold agent. The present composition can be substantially free of chelating agent threshold agent or sequestrant. The methods and compositions can provide magnesium ion at predefined ratios to calcium ion in water, such as magnesium ion in a molar amount equal to or in excess over a molar amount of calcium ion. It is preferred that the water soluble magnesium salt include an anion that, together with calcium ion, forms a water soluble calcium salt. Such compositions can be used for reducing scale, rinsing, hard surface cleaning, laundry and ware washing.

The present invention relates to a method of cleaning an object. The method can reduce hard water spotting, scaling, ash buildup in laundry or deposits. The method can include contacting the object with an aqueous composition comprising water, a water soluble magnesium salt, and, optionally, an ingredient selected from the group consisting of source of alkalinity, surfactants, and a mixture thereof. In an embodiment, the method employs water soluble magnesium compound as a substitute or partial substitute for conventional builder, chelating agent, sequestrant, or threshold agent. The method can employ an aqueous composition that is substantially free of chelating agent threshold agent or sequestrant. The methods can employ magnesium ion at predefined ratios to calcium ion in water, such as magnesium ion in a molar amount equal to or in excess over a molar amount of calcium ion. It is preferred that the water soluble magnesium salt can include an anion that, together with calcium ion, forms a water soluble calcium salt.

The invention also includes cleaning compositions. The cleaning composition includes water soluble magnesium salt and any of a variety of other components useful for cleaning an object. For example, the composition can include water soluble magnesium salt, source of alkalinity, water, surfactant, or the like. In an embodiment, the composition can include about 1 to about 60 wt-% water soluble magnesium salt; about 0 to about 60 wt-% source of alkalinity; about 0 to about 90 wt-% water; about 0 to about 20 wt-% surfactant; and about 0 to about 7 wt-% builder.

In an embodiment, the composition includes water soluble magnesium compound as a substitute or partially substituted for conventional builder, chelating agent, sequestrant, or threshold agent. The composition can include magnesium ion at predefined ratios to calcium ion in water, such as magnesium ion in a molar amount equal to or in excess over a molar amount of calcium ion. It is preferred the water soluble magnesium salt can include an anion that, together with calcium ion, forms a water soluble calcium salt.

BRIEF DESCRIPTION OF THE FIGURES

FIG. 1 is a plot of the performance of STPP as a builder in the presence of various levels of calcium, at various temperatures, and at a constant pH of 8.

FIG. 2 is a plot of the performance of magnesium chloride in preventing precipitation in the presence of various levels of calcium, at various temperatures, and at a constant pH of 8.

FIG. 3 is a plot of the performance of STPP as a builder in the presence of various levels of calcium, at various temperatures, and at a constant pH of 10.

FIG. 4 is a plot of the performance of magnesium chloride in preventing precipitation in the presence of various levels of calcium, at various temperatures, and at a constant pH of 10.

FIG. 5 is a plot of the performance of STPP as a builder in the presence of various levels of calcium, at various temperatures, and at a constant pH of 12.

FIG. 6 is a plot of the performance of magnesium chloride in preventing precipitation in the presence of various levels of calcium, at various temperatures, and at a constant pH of 12.

DETAILED DESCRIPTION OF THE INVENTION

Definitions

Figure 1:
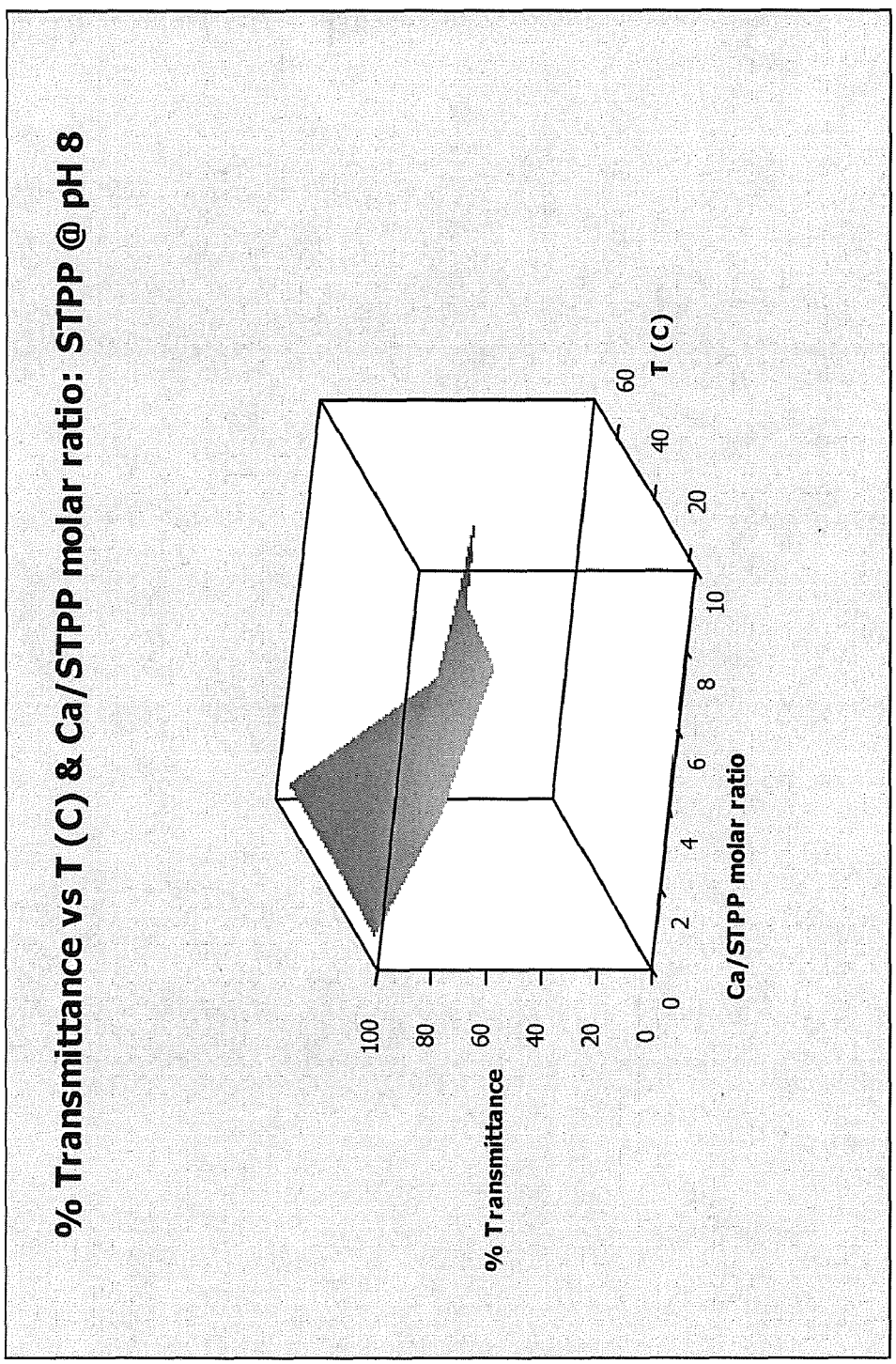
FIGS. 1-6 each have an x, y, and z axis. The x-axis is a measure of the molar ratio of calcium to builder, e.g., STPP, or water soluble magnesium compound. The y-axis is a measure of the level of light transmittance thru the samples with 0% being no light transmitted and 100% being the entire beam of light transmitted. Full or partial loss of transmittance occurs as a consequence of the presence of particulate formation in the initially clear samples. An effective builder prevents or reduces precipitation resulting in a clear sample. The z-axis is a measure of the test temperature, ranging from 20-60° C.

So that the invention may be more readily understood certain terms are first defined.

As used herein, the terms "chelating agent" and "sequestrant" refer to a compound that forms a complex (soluble or not) with water hardness ions (from the wash water, soil and substrates being washed) in a specific molar ratio. Chelating agents that can form a water soluble complex include sodium tripolyphosphate, EDTA, DTPA, NTA, citrate, and the like. Sequestrants that can form an insoluble complex include sodium triphosphate, zeolite A, and the like. As used herein, the terms "chelating agent" and "sequestrant" are synonymous.

As used herein, the term "free of chelating agent" or "substantially free of chelating agent" refers to a composition, mixture, or ingredients that does not contain a chelating agent or sequestrant or to which only a limited amount of a chelating agent or sequestrant has been added. Should a chelating agent or sequestrant be present, the amount of a chelating agent or sequestrant shall be less than about 7 wt %. In some embodiments, such an amount of a chelating agent or sequestrant is less than about 2 wt-%. In other embodiments, such an amount of a chelating agent or sequestrant is less then about 0.5 wt-%. In still yet other embodiments, such an amount of a chelating agent or sequestrant is less than about 0.1 wt-%.

As used herein, the term "lacking an effective amount of chelating agent" refers to a composition, mixture, or ingredients that contains too little chelating agent or sequestrant to measurably affect the hardness of water.

As used herein, the term "water soluble" refers to a compound that can be dissolved in water at a concentration of more than 1 wt-%.

As used herein, the terms "slightly soluble" or "slightly water soluble" refer to a compound that can be dissolved in water only to a concentration of 0.1 to 1.0 wt-%.

As used herein, the term "water insoluble" refers to a compound that can be dissolved in water only to a concentration of less than 0.1 wt-%. For example, magnesium oxide is considered to be insoluble as it has a water solubility (wt %) of about 0.00062 in cold water, and about 0.00860 in hot water. Other insoluble compounds for use with the methods of the present invention include, for example: magnesium hydroxide with a water solubility of 0.00090 in cold water and 0.00400 in hot water; aragonite with a water solubility of 0.00153 in cold water and 0.00190 in hot water; and calcite with a water solubility of 0.00140 in cold water and 0.00180 in hot water.

As used herein, the term "threshold agent" refers to a compound that inhibits crystallization of water hardness ions from solution, but that need not form a specific complex with the water hardness ion. This distinguishes a threshold agent from a chelating agent or sequestrant. Threshold agents include a polyacrylate, a polymethacrylate, an olefin/maleic copolymer, and the like.

As used herein, the term "free of threshold agent" or "substantially free of threshold agent" refers to a composition, mixture, or ingredient that does not contain a threshold agent or to which only a limited amount of a threshold agent has been added. Should a threshold agent be present, the amount of a threshold agent shall be less than about 7 wt %. In some embodiments, such an amount of a threshold agent is less than about 2 wt-%. In other embodiments, such an amount of a threshold agent is less then about 0.5 wt-%. In still yet other embodiments, such an amount of a threshold agent is less than about 0.1 wt-%.

As used herein, the term "antiredeposition agent" refers to a compound that helps keep a soil composition suspended in water instead of redepositing onto the object being cleaned.

As used herein, the term "phosphate-free" or "substantially phosphate-free" refers to a composition, mixture, or ingredient that does not contain a phosphate or phosphate-containing compound or to which a phosphate or phosphate-containing compound has not been added. Should a phosphate or phosphate-containing compound be present through contamination of a phosphate-free composition, mixture, or ingredients, the amount of phosphate shall be less than about 1.0 wt %. In some embodiments, the amount of phosphate is less than about 0.5 wt %. In other embodiments, the amount of phosphate is less then about 0.1 wt %. In still yet other embodiments, the amount of phosphate is less than about 0.01 wt %.

As used herein, the term "phosphorus-free" or "substantially phosphorus-free" refers to a composition, mixture, or ingredient that does not contain phosphorus or a phosphorus-containing compound or to which phosphorus or a phosphorus-containing compound has not been added. Should phosphorus or a phosphorus-containing compound be present through contamination of a phosphorus-free composition, mixture, or ingredients, the amount of phosphorus shall be less than about 1.0 wt %. In some embodiments, the amount of phosphorous is less than about 0.5 wt %. In other embodiments, the amount of phosphorus is less than about 0.1 wt %. In still yet other embodiments, the amount of phosphorus is less than about 0.01 wt %.

"Cleaning" means to perform or aid in soil removal, bleaching, microbial population reduction, or combination thereof.

As used herein, the term "ware" refers to items such as eating and cooking utensils and other hard surfaces such as showers, sinks, toilets, bathtubs, countertops, windows, mirrors, transportation vehicles, and floors. As used herein, the term "warewashing" refers to washing, cleaning, or rinsing ware.

As used herein, the term "hard surface" includes showers, sinks, toilets, bathtubs, countertops, windows, mirrors, transportation vehicles, floors, and the like.

As used herein, the phrase "health care surface" refers to a surface of an instrument, a device, a cart, a cage, furniture, a structure, a building, or the like that is employed as part of a health care activity. Examples of health care surfaces include surfaces of medical or dental instruments, of medical or dental devices, of autoclaves and sterilizers, of electronic apparatus employed for monitoring patient health, and of floors, walls, or fixtures of structures in which health care occurs. Health care surfaces are found in hospital, surgical, infirmity, birthing, mortuary, and clinical diagnosis rooms. These surfaces can be those typified as "hard surfaces" (such as walls, floors, bed-pans, etc.), or fabric surfaces, e.g., knit, woven, and non-woven surfaces (such as surgical garments, draperies, bed linens, bandages, etc.), or patient-care equipment (such as respirators, diagnostic equipment, shunts, body scopes, wheel chairs, beds, etc.), or surgical and diagnostic equipment. Health care surfaces include articles and surfaces employed in animal health care.

As used herein, the term "instrument" refers to the various medical or dental instruments or devices that can benefit from cleaning using water treated according to the methods of the present invention.

As used herein, the phrases "medical instrument," "dental instrument," "medical device," "dental device," "medical equipment," or "dental equipment" refer to instruments, devices, tools, appliances, apparatus, and equipment used in medicine or dentistry. Such instruments, devices, and equipment can be cold sterilized, soaked or washed and then heat sterilized, or otherwise benefit from cleaning using water treated according to the present invention. These various instruments, devices and equipment include, but are not limited to: diagnostic instruments, trays, pans, holders, racks, forceps, scissors, shears, saws (e.g. bone saws and their blades), hemostats, knives, chisels, rongeurs, files, nippers, drills, drill bits, rasps, burrs, spreaders, breakers, elevators, clamps, needle holders, carriers, clips, hooks, gouges, curettes, retractors, straightener, punches, extractors, scoops, keratomes, spatulas, expressors, trocars, dilators, cages, glassware, tubing, catheters, cannulas, plugs, stents, scopes (e.g., endoscopes, stethoscopes, and arthoscopes) and related equipment, and the like, or combinations thereof.

As used herein, a solid cleaning composition refers to a cleaning composition in the form of a solid such as a powder, a flake, a granule, a pellet, a tablet, a lozenge, a puck, a briquette, a brick, a solid block, a unit dose, or another solid form known to those of skill in the art. The term "solid" refers to the state of the detergent composition under the expected conditions of storage and use of the solid detergent composition. In general, it is expected that the detergent composition will remain in solid form when exposed to temperatures of up to about 100° F. and greater than about 120° F.

By the term "solid" as used to describe the processed composition, it is meant that the hardened composition will not flow perceptibly and will substantially retain its shape under moderate stress or pressure or mere gravity, as for example, the shape of a mold when removed from the mold, the shape of an article as formed upon extrusion from an extruder, and the like. The degree of hardness of the solid cast composition can range from that of a fused solid block which is relatively dense and hard, for example, like concrete, to a consistency characterized as being malleable and sponge-like, similar to caulking material.

As used herein, "weight percent (wt-%)," "percent by weight," "% by weight," and the like are synonyms that refer to the concentration of a substance as the weight of that substance divided by the total weight of the composition and multiplied by 100.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about," the claims include equivalents to the quantities.

Compositions and Methods of Use

The present invention relates to cleaning compositions comprising a water soluble magnesium compound, and methods of use thereof. In some embodiments, cleaning compositions comprising the hardness ion $Mg^{2+}$ can have beneficial effects in reducing certain deleterious effects of hard water. Unexpectedly, in an embodiment, a composition of water and the hardness ion $Mg^{2+}$ worked as well as a conventional chelating agent or sequestrant (sodium tripolyphosphate (STPP)) at preventing precipitation of calcium salts. The present compositions and methods can include water soluble magnesium salt as a substitute or partial substitution for a builder, chelating agent, sequestrant, or threshold agent.

In some embodiments, the present cleaning composition is free, or substantially free of added sequestrant, chelating agent, or threshold agent. In an embodiment, the aqueous composition includes less than 1 wt-% phosphorus and/or less than 1 wt-% phosphate. Conventional cleaning compositions include chelating agents to reduce problems caused by water hardness ions. The present compositions, unexpectedly, include a water soluble salt of the hardness ion magnesium to reduce problems caused by hard water.

Cleaning compositions of the present invention comprising water soluble magnesium salts provide magnesium ion at predefined ratios to calcium ion in water. The compositions of the present invention can advantageously be used for reducing lime scale, rinsing, hard surface cleaning, ware washing, or the like. For example, in some embodiments, the compositions of the present invention provide magnesium ion in a molar amount equal to or in excess over a molar amount of calcium ion. In some embodiments, magnesium ion and calcium ion can be in a molar ratio of 1:1 or the composition can include a greater amount of magnesium ion. In other embodiments, magnesium ion and calcium ion can be in a molar ratio of about 1.5:1 up to about 6:1.

In other embodiments, cleaning compositions of the present invention comprise water soluble magnesium salt including an anion of a water soluble calcium salt. It has been found that such compositions are more effective than a magnesium salt with an anion of a water insoluble calcium salt, when used for reducing lime scale, rinsing, hard surface cleaning, ware washing, or the like. Sulfate forms a water soluble salt with magnesium, but its calcium salt is sparingly soluble in water. In some embodiments, the anions that form water soluble salts with both magnesium ion and calcium ion include chloride and acetate. In some embodiments, the water soluble magnesium salt includes an anion that forms an insoluble calcium salt; and the aqueous composition, upon dilution for use, includes magnesium ion in a molar amount equal to or greater than two-times the molar amount of calcium ion.

In some embodiments, the compositions of the present invention lack an effective amount or are substantially free of, for example, chelating agent, sequestrant, builder, and threshold agent. In other embodiments, the compositions of the present invention can contain surfactants and sheeting agents and mixture thereof.

The aqueous composition can include any of a variety of additional components useful in cleaning compositions. Certain of these components are described in this application. In an embodiment, the aqueous composition also includes aesthetic adjuvants such as dyes and fragrances, antimicrobials, bleach, reducing agent, surfactant.

In some embodiments, the cleaning compositions of the present invention comprise water soluble magnesium salt, source of alkalinity, water, surfactant; and optionally are substantially free of chelating and threshold agents. In an embodiment, this cleaning composition includes about 1 to about 60 wt-% water soluble magnesium salt; about 0 to about 60 wt-% source of alkalinity; about 0 to about 90 wt-% water; about 0 to about 20 wt-% surfactant; optionally about 0 to about 7 wt-% of chelating or threshold agent.

Such a composition can include, for example, water soluble magnesium salt, water insoluble magnesium compound, source of alkalinity, and water. In an embodiment, this cleaning composition includes about 1 to about 60 wt-% water soluble magnesium salt; about 0 to about 30 wt-% water insoluble magnesium compound; about 0 to about 60 wt-% source of alkalinity; about 0 to about 90 wt-% water. The composition can be substantially free of or free of chelating agent.

The composition can include magnesium compound at a predetermined ratio to the calcium in water. The magnesium compound can be a water soluble magnesium salt including an anion that preferably forms a water soluble salt with calcium. Anions that form water soluble salts with both magnesium ion and calcium ion include chloride and acetate. Sulfate forms a water soluble salt with magnesium, but its calcium salt is water insoluble. The composition can lack an effective amount or be substantially free of, for example, chelating agent, sequestrant, builder, threshold agent, surfactant, and sheeting agent.

Warewashing Composition

In some embodiments, a cleaning composition of the present invention comprising water soluble magnesium salt can be a warewashing composition. Table 1 describes ingredients for suitable warewashing compositions of the present invention including water soluble magnesium salt.

TABLE 1

| Ingredient | Warewashing Composition 1 (wt-%) | Warewashing Composition 2 (wt-%) |
|---|---|---|
| Water soluble magnesium salt | 1-60 | 5-50 |
| alkaline source | 0-60 | 10-50 |
| surfactant | 0-20 | 0.5-15 |
| bleaching agent | 0-40 | 1-20 |
| filler | 0-20 | 3-15 |
| defoaming agent | 0-3 | 0.1-2 |
| anti-deposition agent | 0-10 | 1-5 |
| stabilizing agent | 0-15 | 2-10 |
| dispersant | 0-15 | 2-9 |
| enzyme | 0-10 | 1-5 |
| water | 0-90 | |

In some embodiments, the warewashing detergent composition includes a cleaning agent, an alkaline source, and water soluble magnesium salt. The cleaning agent can comprise a detersive amount of a surfactant. The alkaline source is provided in an amount effect to provide a use composition having a pH of at least about 8 when measured at a concentration of about 0.5 wt. %. The warewashing detergent composition can be formulated to be combined with water of dilution at a dilution ratio of dilution water to detergent composition of at least about 20:1. The warewashing composition prior to dilution to provide the use composition can be referred to as the warewashing composition concentrate or more simply as the concentrate. The concentrate can be provided in various forms including as a liquid or as a solid. Pastes and gels can be considered types of liquid. Powders, agglomerates, pellets, tablets, and blocks can be considered types of solid.

The warewashing composition, can be available for cleaning in environments other than inside an automatic dishwashing or warewashing machine. For example, the composition can be used as a pot and pan cleaner for cleaning glass, dishes, etc. in a sink.

Hard Surface Cleaner

In some embodiments, the cleaning composition of the present invention including water soluble magnesium salt can be a hard surface cleaning composition. Table 2 describes ingredients for suitable hard surface cleaners including water soluble magnesium salt.

TABLE 2

Hard Surface Cleaning Compositions

| Ingredient | Hard Surface Cleaner 1 (wt-%) | Hard Surface Cleaner 2 (wt-%) | Hard Surface Cleaner 3 (wt-%) |
|---|---|---|---|
| Water soluble magnesium salt | 1-60 | 5-50 | 10-40 |
| nonionic surfactant | 0-20 | 0.1-15 | 0.5-8 |
| anionic surfactant | 0-20 | 0.1-15 | 0.5-8 |
| amphoteric surfactant | 0-10 | 0.1-8 | 0.5-5 |
| anti-redeposition agent | 0-10 | 0.1-8 | 0.3-5 |
| alkalinity source | 0-60 | 0.5-25 | 1-20 |
| thickener | 0-5 | 0.1-4 | 0.5-3 |
| organic solvent | 0-20 | 0.1-15 | 0.5-10 |
| antimicrobial agent | 0-20 | 0.01-15 | 0.03-10 |
| solidification agent | 5-90 | 10-80 | 20-60 |
| water | balance | balance | balance |

| Ingredient | Hard Surface Cleaner 4 (wt-%) | Hard Surface Cleaner 5 (wt-%) | Hard Surface Cleaner 6 (wt-%) |
|---|---|---|---|
| Water soluble magnesium salt | 1-60 | 5-50 | 10-40 |
| nonionic surfactant | 0-20 | 0.1-15 | 0.5-8 |
| anionic surfactant | 0-20 | 0.1-15 | 0.5-8 |
| amphoteric surfactant | 0-10 | 0.1-8 | 0.5-5 |
| anti-redeposition agent | 0-10 | 0.1-8 | 0.3-5 |
| alkalinity source | 0-60 | 0.5-25 | 1-20 |
| thickener | 0-5 | 0.1-4 | 0.5-3 |
| organic solvent | 0-20 | 0.1-15 | 0.5-10 |
| antimicrobial agent | 0-20 | 0.01-15 | 0.03-10 |
| water | balance | balance | balance |

A hard surface cleaner can be configured to be diluted with water to provide a use composition that can be used to clean hard surfaces. Examples of hard surfaces include, but are not limited to: architectural surfaces such as walls, showers, floors, sinks, mirrors, windows, and countertops; transportation vehicles such as cars, trucks, buses, trains, and planes; surgical or dental instruments; food processing equipment; and washing equipment such as dishwashers or laundry machines.

Solid Cleaning Compositions

In some embodiments, the cleaning composition of the present invention including water soluble magnesium salt can be a solid cleaning composition. Table 3 describes ingredients for solid cleaning compositions including water soluble magnesium salt.

TABLE 3

| Ingredient | Solid Cleaning Composition 1 (wt-%) | Solid Cleaning Composition 2 (wt-%) |
|---|---|---|
| Water soluble magnesium salt | 0-60 | 5-50 |
| Surfactant | 0-40 | 1-20 |
| solidifying agent | 0-80 | 0-60 |
| sodium hydroxide | 0-60 | 30-40 |
| alkali metal carbonate | 0-60 | 30-55 |
| water | 0-50 | 0.1-30 |
| binding agent | 10-80 | 1-40 |

Shower Cleaner Composition

In some embodiments, the cleaning compositions of the present invention including water soluble magnesium salt can be a shower cleaning composition. Shower cleaning compositions can be employed for cleaning shower surfaces such as plumbing fixtures, walls, glass shower doors, and the like. Table 4 describes ingredients for shower cleaning compositions including water soluble magnesium salt.

TABLE 4

Shower Cleaning Compositions

| Ingredient | Shower Cleaning Composition 1 (wt-%) | Shower Cleaning Composition 2 (wt-%) | Shower Cleaning Composition 3 (wt-%) |
| --- | --- | --- | --- |
| Water soluble magnesium salt | 1-60 | 5-50 | 10-40 |
| sheeting agent/humectant | 0-20 | 0.1-15 | 0.5-8 |
| thickener | 0-5 | 0.1-4 | 0.5-3 |
| organic solvent | 0-20 | 0.1-15 | 0.5-10 |
| antimicrobial agent | 0-20 | 0.01-15 | 0.03-10 |
| solidification agent | 5-90 | 10-80 | 20-60 |
| water | balance | balance | balance |

| Ingredient | Shower Cleaning Composition 4 (wt-%) | Shower Cleaning Composition 5 (wt-%) | Shower Cleaning Composition 6 (wt-%) |
| --- | --- | --- | --- |
| Water soluble magnesium salt | 1-60 | 5-50 | 10-40 |
| sheeting agent/humectant | 0-20 | 0.1-15 | 0.5-8 |
| thickener | 0-5 | 0.1-4 | 0.5-3 |
| organic solvent | 0-20 | 0.1-15 | 0.5-10 |
| antimicrobial agent | 0-20 | 0.01-15 | 0.03-10 |
| solidification agent | 0-20 | 0.01-15 | 0.03-10 |
| water | balance | balance | balance |

A shower cleaner composition can be formulated at a pH of about 6 to about 10 or about 7 to about 8. The formulations can be diluted with water prior to use. Typically, the concentrates are diluted at a ratio of at least 1 ounce per gallon of cleaning solution suitable for the end use of cleaning a shower, but in some applications the concentrates are suitable for end use without dilution, e.g. where heavy soil levels are encountered.

Rinse Agent Composition

In some embodiments, the cleaning composition of the present invention including water soluble magnesium salt can be a rinse agent composition. Table 5 describes ingredients for rinse agent compositions including water soluble magnesium salt.

TABLE 5

Rinse Agent Compositions

| Ingredient | Rinse Agent Composition 1 (wt-%) | Rinse Agent Composition 2 (wt-%) |
| --- | --- | --- |
| water soluble magnesium salt | 0-60 | 5-50 |
| sheeting agent | 1-90 | 3-50 |
| humectant | 0-90 | 3-50 |
| water | 0-90 | 3-50 |
| solidification agent | 0-90 | 20-50 |
| defoamer | 0-10 | 0.1-5 |
| pH buffers | To desired pH | To desired pH |

In some aspects, the compositions of the present invention comprise a water soluble magnesium salt. In some embodiments, the compositions of the present invention are free of, or substantially free of, chelating agents, threshold agents, and/or sequestering agents. In some embodiments, the compositions of the present invention comprise an ingredient selected from the group consisting of a source of alkalinity, a surfactant, and combinations thereof.

Water Soluble Magnesium Salts

Suitable water soluble magnesium compounds include those selected from the group consisting of magnesium acetate, magnesium benzoate, magnesium bromide, magnesium bromate, magnesium chlorate, magnesium chloride, magnesium chromate, magnesium citrate, magnesium formate, magnesium hexafluorosilicate, magnesium iodate, magnesium iodide, magnesium lactate, magnesium molybdate, magnesium nitrate, magnesium perchlorate, magnesium phosphinate, magnesium salicylate, magnesium sulfate, magnesium sulfite, magnesium thiosulfate, a hydrate thereof, and a mixture thereof. These salts can be provided as hydrated salts or anhydrous salts.

Suitable water soluble magnesium compounds include magnesium salts with an anion that also forms a soluble salt with calcium. Such salts include those selected from the group consisting of magnesium acetate, magnesium benzoate, magnesium bromide, magnesium bromate, magnesium chlorate, magnesium chloride, magnesium chromate, magnesium formate, magnesium iodide, magnesium lactate, magnesium nitrate, magnesium perchlorate, magnesium phosphinate, magnesium salicylate, a hydrate thereof, and a mixture thereof. These salts can be provided as hydrated salts or anhydrous salts.

Water soluble magnesium compounds approved as GRAS for direct food contact include magnesium chloride and magnesium sulfate.

Alkalinity Source

In some embodiments, the compositions of the present invention further comprise one or more alkaline sources. The alkaline source can be selected such that it enhances the cleaning of an article, and improves the soil removal performance of the composition. In general, an effective amount of one or more alkaline sources should be considered as an amount that provides a use composition having a pH of at least about 8. When the use composition has a pH of between about 8 and about 10, it can be considered mildly alkaline, and when the pH is greater than about 12, the use composition can be considered caustic. In general, it is desirable to provide the use composition as a mildly alkaline cleaning composition because it is considered to be more safe than the caustic based use compositions.

The cleaning composition can include an alkali metal carbonate and/or an alkali metal hydroxide as a suitable alkaline source. Suitable metal carbonates that can be used include, for example, sodium carbonate, potassium carbonate, lithium carbonate, sodium bicarbonate, potassium bicarbonate, lithium bicarbonate, sodium sesquicarbonate, potassium sesquicarbonate, lithium sesquicarbonate, and combinations thereof. Suitable alkali metal hydroxides that can be used include, for example, sodium hydroxide, lithium hydroxide, potassium hydroxide, and combinations thereof. An alkali metal hydroxide can be added to the composition in the form of solid beads, dissolved in an aqueous solution, or a combination thereof. Alkali metal hydroxides are commercially available as a solid in the form of prilled solids or beads having a mix of particle sizes ranging from about 12-100 U.S. mesh, or as an aqueous solution, as for example, as a 50 wt-% and a 73 wt-% solution.

In some embodiments, the compositions of the present invention comprise an alkaline source in an amount of at least about 5 wt-%, at least about 10 wt-%, or at least about 15 wt-%. The cleaning compositions can include about 10 to about 95 wt-%, about 20 to about 75 wt-%, or about 25 to about 65 wt-% of a source of alkalinity. It is to be understood that all ranges and values between these ranges and values are encompassed by the present invention In some embodiments, the alkaline source can be provided in an amount of less than about 60 wt-%. In addition, the alkaline source can be provided at a level of less than about 40 wt-%, less than about 30 wt-%, or less than about 20 wt-%. In certain embodiments, it is expected that the solid cleaning composition can provide a use composition that is useful at pH levels below about 8. In such compositions, an alkaline source can be omitted, and additional pH adjusting agents can be used to provide the use composition with the desired pH. Accordingly, it should be understood that the source of alkalinity can be characterized as an optional component.

Secondary Alkalinity Sources

Compositions of the present invention can also include a secondary alkaline source separate from the source of alkalinity discussed above. The secondary source of alkaline can comprise about 0 to about 75 wt-%, about 0.1 to about 70 wt-%, about 1 to about 25 wt-%, about 20 to about 60 wt-%, or about 30 to about 70 wt-% of the total composition.

Secondary alkalinity sources can include, for example, inorganic alkalinity sources, such as an alkali metal hydroxide or silicate, or the like. Suitable alkali metal hydroxides include, for example, sodium, potassium, or lithium hydroxide. An alkali metal hydroxide may be added to the composition in a variety of forms, including for example in the form of solid beads, dissolved in an aqueous solution, or a combination thereof. Examples of useful alkaline metal silicates include sodium, potassium, or lithium silicate (with a $M_2O$:$SiO_2$ ratio of 1:1.8 to 5:1, M representing an alkali metal) or metasilicate.

Other sources of alkalinity include: a metal borate such as sodium or potassium borate; ethanolamines and amines; and other like alkaline sources.

Builder

In some embodiments, the compositions of the present invention comprise about 0 to about 5 wt %, about 0 to about 4 wt %, or about 0 to about 2 wt % of a builder. In other embodiments, the compositions of the present invention are substantially free of a builder. If a builder is included in the present cleaning composition, it is a builder that has a higher chelation constant for calcium versus that of magnesium. Zeolite 3A is an example of this type of builder. A purpose of such builder can be to increase the molar ratio of Mg/Ca in the use solution. This can reduce the amount of magnesium compound used as an ingredient in the solid composition.

Threshold Agent

In some embodiments, the compositions of the present invention comprise about 0 to about 5 wt %, about 0 to about 4 wt %, or about 0 to about 2 wt % of a threshold agent. In other embodiments, the compositions of the present invention are substantially free of a threshold agent. If a threshold agent is included in the present cleaning composition, it is preferred that it is a threshold agent, which inhibits or inhibits to a greater extent the crystal growth of the calcite form of calcium carbonate and not the aragonite form of calcium carbonate.

Chelating Agent or Sequestrant

The present composition can be substantially free of added sequestrant or chelating agent or, even, free of added sequestrant or chelating agent. Chelating agents or sequestrants include phosphonates, phosphates, aminocarboxylates, polycarboxylates, and the like.

An ineffective amount of chelating agent or sequestrant will vary with the hardness of the water and the dilution rate of a concentrate. In an embodiment, for 17 grain hard water, an ineffective amount of a chelating agent or sequestrant in a use composition can be less than about 15 wt-%. This is based on a detergent used at a 1000 ppm concentration and STPP as chelating agent/sequestrant. This 15 wt-% STPP would chelate about 25% of the hardness ions present. One skilled in the art will realize that the effective level of a chelating agent or sequestrant will be dependent upon the chemical structure of the compound and the dilution rate of the formulation containing it.

A typical warewash concentrate is diluted by about 500-fold to about 2000-fold, which yields an ineffective amount of a chelating agent or sequestrant in it's concentrate of less than 15 wt-%. In an embodiment, the ineffective amount is less than 5 wt-%. In an embodiment, the ineffective amount is less than 1 wt-%.

Water

As used herein with respect to ingredients of the present compositions, water refers to potable water as obtained from a municipal or private water system, e.g., a public water supply or a well. The water can be hard water, city water, well water, water supplied by a municipal water system, water supplied by a private water system, treated water, or water directly from the system or well. In an embodiment, the present method employs water that wasn't treated with a polymeric water softener bed such as in use today and which requires periodic regeneration with sodium chloride to work. In general, hard water refers to water having a level of calcium and magnesium ions in excess of about 100 ppm. Often, the molar ratio of calcium to magnesium in hard water is about 2:1 or about 3:1. Although most locations have hard water, water hardness tends to vary from one location to another.

Organic Surfactants or Cleaning Agents

In some embodiments, the composition can include at least one cleaning agent which can be a surfactant or surfactant system. A variety of surfactants can be used in a cleaning composition, including anionic, nonionic, cationic, and zwitterionic surfactants, which are commercially available from a number of sources. Suitable surfactants include nonionic surfactants. Suitable nonionic surfactants include low foaming non-ionic surfactants. For a discussion of surfactants, see Kirk-Othmer, *Encyclopedia of Chemical Technology*, Third Edition, volume 8, pages 900-912.

Nonionic surfactants are useful in the present solid compositions, include those having a polyalkylene oxide polymer as a portion of the surfactant molecule. Such nonionic surfactants include, for example, chlorine-, benzyl-, methyl-, ethyl-, propyl-, butyl- and other like alkyl-capped polyethylene and/or polypropylene glycol ethers of fatty alcohols; polyalkylene oxide free nonionics such as alkyl polyglycosides; sorbitan and sucrose esters and their ethoxylates; alkoxylated ethylene diamine; carboxylic acid esters such as glycerol esters, polyoxyethylene esters, ethoxylated and glycol esters of fatty acids, and the like; carboxylic amides such as diethanolamine condensates, monoalkanolamine condensates, polyoxyethylene fatty acid amides, and the like; and ethoxylated amines and ether amines commercially available from Tomah Corporation and other like nonionic compounds. Silicone surfactants such as the ABIL B8852 (Goldschmidt) can also be used.

Additional suitable nonionic surfactants having a polyalkylene oxide polymer portion include nonionic surfactants of C6-C24 alcohol ethoxylates (e.g., C6-C14 alcohol ethoxylates) having 1 to about 20 ethylene oxide groups (e.g., about 9 to about 20 ethylene oxide groups); C6-C24 alkylphenol ethoxylates (e.g., C8-C10 alkylphenol ethoxylates) having 1 to about 100 ethylene oxide groups (e.g., about 12 to about 20 ethylene oxide groups); C6-C24 alkylpolyglycosides (e.g., C6-C20 alkylpolyglycosides) having 1 to about 20 glycoside groups (e.g., about 9 to about 20 glycoside groups); C6-C24 fatty acid ester ethoxylates, propoxylates or glycerides; and C4-C24 mono or dialkanolamides.

Specific alcohol alkoxylates include alcohol ethoxylate propoxylates, alcohol propoxylates, alcohol propoxylate ethoxylate propoxylates, alcohol ethoxylate butoxylates, and the like; nonylphenol ethoxylate, polyoxyethylene glycol ethers and the like; and polyalkylene oxide block copolymers including an ethylene oxide/propylene oxide block copolymer such as those commercially available under the trademark PLURONIC (BASF-Wyandotte), and the like.

Suitable nonionic surfactants include low foaming nonionic surfactants. Examples of suitable low foaming nonionic surfactants include secondary ethoxylates, such as those sold under the trade name TERGITOL™, such as TERGITOL™ 15-S-7 (Union Carbide), Tergitol 15-S-3, Tergitol 15-S-9 and the like. Other suitable classes of low foaming nonionic surfactant include alkyl or benzyl-capped polyoxyalkylene derivatives and polyoxyethylene/polyoxypropylene copolymers.

A useful nonionic surfactant for use as a defoamer is nonylphenol having an average of 12 moles of ethylene oxide condensed thereon, it being end capped with a hydrophobic portion comprising an average of 30 moles of propylene oxide. Silicon-containing defoamers are also well-known and can be employed in the compositions and methods of the present invention.

Suitable amphoteric surfactants include amine oxide compounds having the formula:

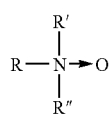

where R, R', R", and R'" are each a $C_1$-$C_{24}$ alkyl, aryl or aralkyl group that can optionally contain one or more P, O, S or N heteroatoms.

Another class of suitable amphoteric surfactants includes betaine compounds having the formula:

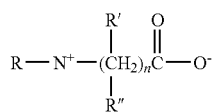

where R, R', R" and R'" are each a $C_1$-$C_{24}$ alkyl, aryl or aralkyl group that can optionally contain one or more P, O, S or N heteroatoms, and n is about 1 to about 10. Suitable surfactants include food grade surfactants, linear alkylbenzene sulfonic acids and their salts, and ethylene oxide/propylene oxide derivatives sold under the Pluronic™ trade name. Suitable surfactants include those that are compatible as an indirect or direct food additive or substance; especially those described in the Code of Federal Regulations (CFR), Title 21-Food and Drugs, parts 170 to 186 (which is incorporated herein by reference).

Anionic surfactants suitable for the present cleaning compositions, include, for example, carboxylates such as alkylcarboxylates (carboxylic acid salts) and polyalkoxycarboxylates, alcohol ethoxylate carboxylates, nonylphenol ethoxylate carboxylates, and the like; sulfonates such as alkylsulfonates, alkylbenzenesulfonates, alkylarylsulfonates, sulfonated fatty acid esters, and the like; sulfates such as sulfated alcohols, sulfated alcohol ethoxylates, sulfated alkylphenols, alkylsulfates, sulfosuccinates, alkylether sulfates, and the like; and phosphate esters such as alkylphosphate esters, and the like. Suitable anionics include sodium alkylarylsulfonate, alpha-olefin sulfonate, and fatty alcohol sulfates. Examples of suitable anionic surfactants include sodium dodecylbenzene sulfonic acid, potassium laureth-7 sulfate, and sodium tetradecenyl sulfonate.

The surfactant can be present at amounts of about 0 to about 20 wt-% about 0.1 to about 10 wt-%, about 0.2 to about 5 wt-%.

Additional Ingredients

In some embodiments, the compositions of the present invention further comprise an additional ingredient. Additional ingredients suitable for use with the compositions of the present invention include, but are not limited to, detersive polymers, rinse aid compositions, softeners, source of acidity, anti-corrosion agent, detergent filler, defoamer, anti-redeposition agent, antimicrobial, aesthetic enhancing agent, e.g., dye, odorant, perfume, optical brightener, lubricant composition, bleaching agent, enzyme, effervescent agent, activator for the source of alkalinity, calcium salt, and/or other such additives or functional ingredients.

The additional ingredient or ingredients will vary according to the type of composition being manufacture, and the intended end use of the composition. In some embodiments, the composition includes as an additive one or more of cleaning enzyme, detersive polymer, antimicrobial, activators for the source of alkalinity, or mixtures thereof.

pH Modifier

The pH modifier can be an organic or inorganic source of alkalinity or a pH buffering agent. Nonlimiting examples include the alkali metal hydroxides, alkali metal carbonates, alkanolamines, salts of weak organic acids, etc. Suitable pH modifiers include sodium hydroxide, lithium hydroxide, potassium hydroxide, calcium hydroxide, sodium carbonate, lithium carbonate, potassium carbonate, calcium carbonate (in aragonite form), and mixtures thereof. Suitable pH modifiers include acetate, formate, gluconate, and the like. Suitable pH modifiers have no or only weak calcium sequestration capability at the pH of the use solution.

The pH modifier can be present at amounts of about 0 to about 60 wt-% about 0.5 to about 25 wt-%, about 1 to about 20 wt-%, Processing Aid Processing aids are materials which enhance the production process for the detergent composition. They can serve as drying agents, modify the rate of solidification, alter the transfer of water of hydration in the formula, or even act as the solidifying matrix itself. Processing aids can have some overlap with other functionalities in the formula. Nonlimiting examples include silica, alkali metal silicates, urea, polyethylene glycols, solid surfactants, sodium carbonate, potassium chloride, sodium sulfate, sodium hydroxide, water, etc. Which processing aid(s) is suitable would of course vary with the manufacturing procedure and specific detergent composition.

The processing aid can be present at amounts of about 1 to about 70 wt-% about 2 to about 50 wt-%, about 3 to about 30 wt.

Active Oxygen Compounds

The active oxygen compound acts to provide a source of active oxygen, but can also act to form at least a portion of the solidification agent. The active oxygen compound can be inorganic or organic, and can be a mixture thereof. Some examples of active oxygen compound include peroxygen compounds, and peroxygen compound adducts that are suitable for use in forming the binding agent.

Many active oxygen compounds are peroxygen compounds. Any peroxygen compound generally known and that can function, for example, as part of the binding agent can be used. Examples of suitable peroxygen compounds include inorganic and organic peroxygen compounds, or mixtures thereof.

The active oxygen compound can be in the present solid composition at amounts of about 0 to about 25 wt-% peroxygen compounds, and peroxygen compound adducts, about 2 to about 15 wt-% peroxygen compounds, and peroxygen compound adducts, or about 5 wt-% to about 12 wt-% peroxygen compounds, and peroxygen compound adducts.

Inorganic Active Oxygen Compound

Examples of inorganic active oxygen compounds include the following types of compounds or sources of these compounds, or alkali metal salts including these types of compounds, or forming an adduct therewith: hydrogen peroxide; group 1 (IA) active oxygen compounds, for example lithium peroxide, sodium peroxide, and the like; group 2 (IIA) active oxygen compounds, for example magnesium peroxide, calcium peroxide, strontium peroxide, barium peroxide, and the like; group 12 (IIB) active oxygen compounds, for example zinc peroxide, and the like; group 13 (IIIA) active oxygen compounds, for example boron compounds, such as perborates, for example sodium perborate hexahydrate of the formula $Na_2[Br_2(O_2)_2(OH)_4] \cdot 6H_2O$ (also called sodium perborate tetrahydrate and formerly written as $NaBO_3 \cdot 4H_2O$); sodium peroxyborate tetrahydrate of the formula $Na_2Br_2(O_2)_2[(OH)_4] \cdot 4H_2O$ (also called sodium perborate trihydrate, and formerly written as $NaBO_3 \cdot 3H_2O$); sodium peroxyborate of the formula $Na_2[B_2(O_2)_2(OH)_4]$ (also called sodium perborate monohydrate and formerly written as $NaBO_3 \cdot H_2O$); and the like; e.g., perborate; group 14 (IVA) active oxygen compounds, for example persilicates and peroxycarbonates, which are also called percarbonates, such as persilicates or peroxycarbonates of alkali metals; and the like; e.g., percarbonate, e.g., persilicate; group 15 (VA) active oxygen compounds, for example peroxynitrous acid and its salts; peroxyphosphoric acids and their salts, for example, perphosphates; and the like; e.g., perphosphate; group 16 (VIA) active oxygen compounds, for example peroxysulfuric acids and their salts, such as peroxymonosulfuric and peroxydisulfuric acids, and their salts, such as persulfates, for example, sodium persulfate; and the like; e.g., persulfate; group VIIa active oxygen compounds such as sodium periodate, potassium perchlorate and the like.

Other active inorganic oxygen compounds can include transition metal peroxides; and other such peroxygen compounds, and mixtures thereof.

In certain embodiments, the compositions and methods of the present invention employ certain of the inorganic active oxygen compounds listed above. Suitable inorganic active oxygen compounds include hydrogen peroxide, hydrogen peroxide adduct, group IIIA active oxygen compounds, group VIA active oxygen compound, group VA active oxygen compound, group VIIA active oxygen compound, or mixtures thereof. Examples of such inorganic active oxygen compounds include percarbonate, perborate, persulfate, perphosphate, persilicate, or mixtures thereof. Hydrogen peroxide presents an example of an inorganic active oxygen compound. Hydrogen peroxide can be formulated as a mixture of hydrogen peroxide and water, e.g., as liquid hydrogen peroxide in an aqueous solution. The mixture of solution can include about 5 to about 40 wt-% hydrogen peroxide or 5 to 50 wt-% hydrogen peroxide.

In an embodiment, the inorganic active oxygen compounds include hydrogen peroxide adduct. For example, the inorganic active oxygen compounds can include hydrogen peroxide, hydrogen peroxide adduct, or mixtures thereof. Any of a variety of hydrogen peroxide adducts are suitable for use in the present compositions and methods. For example, suitable hydrogen peroxide adducts include percarbonate salt, urea peroxide, peracetyl borate, an adduct of $H_2O_2$ and polyvinyl pyrrolidone, sodium percarbonate, potassium percarbonate, mixtures thereof, or the like. Suitable hydrogen peroxide adducts include percarbonate salt, urea peroxide, peracetyl borate, an adduct of $H_2O_2$ and polyvinyl pyrrolidone, or mixtures thereof. Suitable hydrogen peroxide adducts include sodium percarbonate, potassium percarbonate, or mixtures thereof, e.g., sodium percarbonate.

Organic Active Oxygen Compound

Any of a variety of organic active oxygen compounds can be employed in the compositions and methods of the present invention. For example, the organic s active oxygen compound can be a peroxycarboxylic acid, such as a mono- or di-peroxycarboxylic acid, an alkali metal salt including these types of compounds, or an adduct of such a compound. Suitable peroxycarboxylic acids include $C_1$-$C_{24}$ peroxycarboxylic acid, salt of $C_1$-$C_{24}$ peroxycarboxylic acid, ester of $C_1$-$C_{24}$ peroxycarboxylic acid, diperoxycarboxylic acid, salt of diperoxycarboxylic acid, ester of diperoxycarboxylic acid, or mixtures thereof.

Suitable peroxycarboxylic acids include $C_1$-$C_{10}$ aliphatic peroxycarboxylic acid, salt of $C_1$-$C_{10}$ aliphatic peroxycarboxylic acid, ester of $C_1$-$C_{10}$ aliphatic peroxycarboxylic acid, or mixtures thereof; e.g., salt of or adduct of peroxyacetic acid; e.g., peroxyacetyl borate. Suitable diperoxycarboxylic acids include $C_4$-$C_{10}$ aliphatic diperoxycarboxylic acid, salt of $C_4$-$C_{10}$ aliphatic diperoxycarboxylic acid, or ester of $C_4$-$C_{10}$ aliphatic diperoxycarboxylic acid, or mixtures thereof; e.g., a sodium salt of perglutaric acid, of persuccinic acid, of peradipic acid, or mixtures thereof.

Organic active oxygen compounds include other acids including an organic moiety. Suitable organic active oxygen compounds include perphosphonic acids, perphosphonic acid salts, perphosphonic acid esters, or mixtures or combinations thereof.

Active Oxygen Compound Adducts

Active oxygen compound adducts include any generally known and that can function, for example, as a source of active oxygen and as part of the solidified composition. Hydrogen peroxide adducts, or peroxyhydrates, are suitable. Some examples of source of alkalinity adducts include the following: alkali metal percarbonates, for example sodium percarbonate (sodium carbonate peroxyhydrate), potassium percarbonate, rubidium percarbonate, cesium percarbonate, and the like; ammonium carbonate peroxyhydrate, and the like; urea peroxyhydrate, peroxyacetyl borate; an adduct of $H_2O_2$ polyvinyl pyrrolidone, and the like, and mixtures of any of the above.

Antimicrobials

Antimicrobial agents are chemical compositions that can be used in a solid functional material that alone, or in combination with other components, act to reduce or prevent microbial contamination and deterioration of commercial products material systems, surfaces, etc. In some aspects, these materials fall in specific classes including phenolics, halogen compounds, quaternary ammonium compounds, metal derivatives, amines, alkanol amines, nitro derivatives, analides, organosulfur and sulfur-nitrogen compounds and miscellaneous compounds.

It should also be understood that the source of alkalinity used in the formation of compositions embodying the invention also act as antimicrobial agents, and can even provide sanitizing activity. In fact, in some embodiments, the ability of the source of alkalinity to act as an antimicrobial agent reduces the need for secondary antimicrobial agents within the composition. For example, percarbonate compositions have been demonstrated to provide excellent antimicrobial action. Nonetheless, some embodiments incorporate additional antimicrobial agents.

The given antimicrobial agent, depending on chemical composition and concentration, may simply limit further proliferation of numbers of the microbe or may destroy all or a portion of the microbial population. The terms "microbes" and "microorganisms" typically refer primarily to bacteria, virus, yeast, spores, and fungus microorganisms. In use, the antimicrobial agents are typically formed into a solid functional material that when diluted and dispensed, optionally, for example, using an aqueous stream forms an aqueous disinfectant or sanitizer composition that can be contacted with a variety of surfaces resulting in prevention of growth or the killing of a portion of the microbial population. A three log reduction of the microbial population results in a sanitizer composition. The antimicrobial agent can be encapsulated, for example, to improve its stability.

Common antimicrobial agents include phenolic antimicrobials such as pentachlorophenol, orthophenylphenol, a chloro-p-benzylphenol, p-chloro-m-xylenol. Halogen containing antibacterial agents include sodium trichloroisocyanurate, sodium dichloro isocyanate (anhydrous or dihydrate), iodine-poly(vinylpyrrolidinone) complexes, bromine compounds such as 2-bromo-2-nitropropane-1,3-diol, and quaternary antimicrobial agents such as benzalkonium chloride, didecyldimethyl ammonium chloride, choline diiodochloride, tetramethyl phosphonium tribromide. Other antimicrobial compositions such as hexahydro-1,3,5-tris(2-hydroxyethyl)-s-triazine, dithiocarbamates such as sodium dimethyldithiocarbamate, and a variety of other materials are known in the art for their anti-microbial properties. In some embodiments, an antimicrobial component, such as TAED can be included in the range of 0.001 to 75 wt-% of the composition, about 0.01 to 20 wt-%, or about 0.05 to about 10 wt-%.

If present in compositions, the additional antimicrobial agent can be about 0.01 to about 15 wt-% of the composition, 0.05 to about 10 wt-%, or about 0.1 to about 5 wt-%. In a use solution the additional antimicrobial agent can be about 0.001 to about 5 wt-% of the composition, about 0.01 to about 2 wt-%, or about 0.05 to about 0.5 wt-%.

Activators

In some embodiments, the antimicrobial activity or bleaching activity of the composition can be enhanced by the addition of a material which, when the composition is placed in use, reacts with the active oxygen to form an activated component. For example, in some embodiments, a peracid or a peracid salt is formed. For example, in some embodiments, tetraacetylethylene diamine can be included within the composition to react with the active oxygen and form a peracid or a peracid salt that acts as an antimicrobial agent. Other examples of active oxygen activators include transition metals and their compounds, compounds that contain a carboxylic, nitrile, or ester moiety, or other such compounds known in the art. In an embodiment, the activator includes tetraacetylethylene diamine; transition metal; compound that includes carboxylic, nitrile, amine, or ester moiety; or mixtures thereof.

In some embodiments, an activator component can include in the range of 0.001 to 75 wt-%, about 0.01 to about 20 wt-%, or about 0.05 to about 10 wt-% of the composition.

In an embodiment, the activator for the source of alkalinity combines with the active oxygen to form an antimicrobial agent.

The solid composition typically remains stable even in the presence of activator of the source of alkalinity. In many compositions it would be expected to react with and destabilize or change the form of the source of alkalinity. In contrast, in an embodiment of the present invention, the composition remains solid; it does not swell, crack, or enlarge as it would if the source of alkalinity were reacting with the activator.

In an embodiment, the composition includes a solid block, and an activator material for the active oxygen is coupled to the solid block. The activator can be coupled to the solid block by any of a variety of methods for coupling one solid cleaning composition to another. For example, the activator can be in the form of a solid that is bound, affixed, glued or otherwise adhered to the solid block. Alternatively, the solid activator can be formed around and encasing the block. By way of further example, the solid activator can be coupled to the solid block by the container or package for the cleaning composition, such as by a plastic or shrink wrap or film.

Rinse Aid Functional Materials

Functional materials of the invention can include a formulated rinse aid composition containing a wetting or sheeting agent combined with other optional ingredients in a solid made using the complex of the invention. The rinse aid component of the present invention can include a water soluble or dispersible low foaming organic material capable of reducing the surface tension of the rinse water to promote sheeting action and to prevent spotting or streaking caused by beaded water after rinsing is completed. This is often used in warewashing processes. Such sheeting agents are typically organic surfactant-like materials having a characteristic cloud point. The cloud point of the surfactant rinse or sheeting agent is defined as the temperature at which a 1 wt-% aqueous solution of the surfactant turns cloudy when warmed.

There are two general types of rinse cycles in commercial warewashing machines, a first type generally considered a sanitizing rinse cycle uses rinse water at a temperature of about 180° F., about 80° C. or higher. A second type of non-sanitizing machines uses a lower temperature non-sanitizing rinse, typically at a temperature of about 125° F., about 50° C. or higher. Surfactants useful in these applications are aqueous rinses having a cloud point greater than the available hot service water. Accordingly, the lowest useful cloud point measured for the surfactants of the invention is approximately 40° C. The cloud point can also be 60° C. or higher, 70° C. or higher, 80° C. or higher, etc., depending on the use locus hot water temperature and the temperature and type of rinse cycle.

Suitable sheeting agents, typically include a polyether compound prepared from ethylene oxide, propylene oxide, or a mixture in a homopolymer or block or heteric copolymer structure. Such polyether compounds are known as polyalkylene oxide polymers, polyoxyalkylene polymers or polyalkylene glycol polymers. Such sheeting agents require a region of relative hydrophobicity and a region of relative hydrophilicity to provide surfactant properties to the molecule. Such sheeting agents have a molecular weight in the range of about 500 to 15,000. Certain types of (PO)(EO) polymeric rinse aids have been found to be useful containing at least one block of poly(PO) and at least one block of poly(EO) in the polymer molecule. Additional blocks of poly(EO), poly PO or random polymerized regions can be formed in the molecule.

Particularly useful polyoxypropylene polyoxyethylene block copolymers are those including a center block of polyoxypropylene units and blocks of polyoxyethylene units to each side of the center block. Such polymers have the formula shown below:

$(EO)_n\text{-}(PO)_m\text{-}(EO)_n$ wherein n is an integer of 20 to 60, each end is independently an integer of 10 to 130. Another useful block copolymer are block copolymers having a center block of polyoxyethylene units and blocks of polyoxypropylene to each side of the center block. Such copolymers have the formula:

$(PO)_n\text{-}(EO)_m\text{-}(PO)_n$ wherein m is an integer of 15 to 175 and each end are independently integers of about 10 to 30. The solid functional materials of the invention can often use a hydrotrope to aid in maintaining the solubility of sheeting or wetting agents. Hydrotropes can be used to modify the aqueous solution creating increased solubility for the organic material. Suitable hydrotropes are low molecular weight aromatic sulfonate materials such as xylene sulfonates and dialkyldiphenyl oxide sulfonate materials.

In an embodiment, compositions according to the present invention provide desirable rinsing properties in ware washing without employing a separate rinse agent in the rinse cycle. For example, good rinsing occurs using such compositions in the wash cycle when rinsing employs just soft water.

The rinse aid functional material can be in the present solid composition at amounts of about 0 to about 75 wt-%, about 2 to about 50 wt-%, or about 5 wt-% to about 40 wt-%.

Additional Bleaching Agents

Additional bleaching agents for use in inventive formulations for lightening or whitening a substrate, include bleaching compounds capable of liberating an active halogen species, such as $Cl_2$, $Br_2$, $I_2$, $ClO_2$, $BrO_2$, $IO_2$, $-OCl^-$, $-OBr^-$ and/or, $-Ol^-$, under conditions typically encountered during the cleansing process. Suitable bleaching agents for use in the present cleaning compositions include, for example, chlorine-containing compounds such as a chlorite, a hypochlorite, chloramine. Suitable halogen-releasing compounds include the alkali metal dichloroisocyanurates, chlorinated trisodium phosphate, the alkali metal hypochlorites, alkali metal chlorites, monochloramine and dichloramine, and the like, and mixtures thereof. Encapsulated chlorine sources may also be used to enhance the stability of the chlorine source in the composition (see, for example, U.S. Pat. Nos. 4,618,914 and 4,830,773, the disclosure of which is incorporated by reference herein). A bleaching agent may also be an additional peroxygen or active oxygen source such as hydrogen peroxide, perborates, for example sodium perborate mono and tetrahydrate, sodium carbonate peroxyhydrate, phosphate peroxyhydrates, and potassium permonosulfate, with and without activators such as tetraacetylethylene diamine, and the like, as discussed above.

A cleaning composition may include a minor but effective additional amount of a bleaching agent above that already available from the stabilized source of alkalinity, e.g., about 0-10 wt-% or about 1-6 wt-%. The present solid compositions can include bleaching agent in an amount of about 0 to about 60 wt-% about 1 to about 20 wt-%, about 3 to about 8 wt-% or about 3 to about 6 wt-%.

Hardening Agents

The detergent compositions may also include a hardening agent in addition to, or in the form of, the builder. A hardening agent is a compound or system of compounds, organic or inorganic, which significantly contributes to the uniform solidification of the composition. The hardening agents should be compatible with the cleaning agent and other active ingredients of the composition and should be capable of providing an effective amount of hardness and/or aqueous solubility to the processed detergent composition. The hardening agents should also be capable of forming a homogeneous matrix with the cleaning agent and other ingredients when mixed and solidified to provide a uniform dissolution of the cleaning agent from the detergent composition during use.

The amount of hardening agent included in the detergent composition will vary according to factors including, but not limited to: the type of detergent composition being prepared, the ingredients of the detergent composition, the intended use of the detergent composition, the quantity of dispensing solution applied to the detergent composition over time during use, the temperature of the dispensing solution, the hardness of the dispensing solution, the physical size of the detergent composition, the concentration of the other ingredients, and the concentration of the cleaning agent in the composition. The amount of the hardening agent included in the solid detergent composition should be effective to combine with the cleaning agent and other ingredients of the composition to form a homogeneous mixture under continuous mixing conditions and a temperature at or below the melting temperature of the hardening agent.

The hardening agent may also form a matrix with the cleaning agent and other ingredients which will harden to a solid form under ambient temperatures of about 30° C. to about 50° C., particularly about 35° C. to about 45° C., after mixing ceases and the mixture is dispensed from the mixing system, within about 1 minute to about 3 hours, particularly about 2 minutes to about 2 hours, and particularly about 5 minutes to about 1 hour. A minimal amount of heat from an external source may be applied to the mixture to facilitate processing of the mixture. The amount of the hardening agent included in the detergent composition should be effective to provide a desired hardness and desired rate of controlled solubility of the processed composition when placed in an aqueous medium to achieve a desired rate of dispensing the cleaning agent from the solidified composition during use.

The hardening agent may be an organic or an inorganic hardening agent. A particular organic hardening agent is a polyethylene glycol (PEG) compound. The solidification rate of detergent compositions comprising a polyethylene glycol hardening agent will vary, at least in part, according to the amount and the molecular weight of the polyethylene glycol added to the composition. Examples of suitable polyethylene glycols include, but are not limited to: solid polyethylene glycols of the general formula $H(OCH_2CH_2)_nOH$, where n is greater than 15, more particularly about 30 to about 1700. Typically, the polyethylene glycol is a solid in the form of a free-flowing powder or flakes, having a molecular weight of about 1,000 to about 100,000, particularly having a molecular weight of at least about 1,450 to about 20,000, more particularly between about 1,450 to about 8,000. The polyethylene glycol is present at a concentration of from about 1% to about 75% by weight and particularly about 3% to about 15% by weight. Suitable polyethylene glycol compounds include, but are not limited to: PEG 4000, PEG 1450, and PEG 8000 among others, with PEG 4000 and PEG 8000 being most preferred. An example of a commercially available solid polyethylene glycol includes, but is not limited to: CARBO-WAX, available from Union Carbide Corporation, Houston, Tex.

Particular inorganic hardening agents are hydratable inorganic salts, including, but not limited to: sulfates, acetates, and bicarbonates. In an exemplary embodiment, the inorganic hardening agents are present at concentrations of up to about 50% by weight, particularly about 5% to about 25% by weight, and more particularly about 5% to about 15% by weight.

Urea particles may also be employed as hardeners in the detergent compositions. The solidification rate of the compositions will vary, at least in part, to factors including, but not limited to: the amount, the particle size, and the shape of the urea added to the detergent composition. For example, a particulate form of urea may be combined with a cleaning agent and other ingredients, as well as a minor but effective amount of water. The amount and particle size of the urea is effective to combine with the cleaning agent and other ingredients to form a homogeneous mixture without the application of heat from an external source to melt the urea and other ingredients to a molten stage. The amount of urea included in the solid detergent composition should be effective to provide a desired hardness and desired rate of solubility of the composition when placed in an aqueous medium to achieve a desired rate of dispensing the cleaning agent from the solidified composition during use. In an exemplary embodiment, the detergent composition includes between about 5% to about 90% by weight urea, particularly between about 8% and about 40% by weight urea, and more particularly between about 10% and about 30% by weight urea.

The urea may be in the form of prilled beads or powder. Prilled urea is generally available from commercial sources as a mixture of particle sizes ranging from about 8-15 U.S. mesh, as for example, from Arcadian Sohio Company, Nitrogen Chemicals Division. A prilled form of urea is milled to reduce the particle size to about 50 U.S. mesh to about 125 U.S. mesh, particularly about 75-100 U.S. mesh, particularly using a wet mill such as a single or twin-screw extruder, a Teledyne mixer, a Ross emulsifier, and the like.

Secondary Hardening Agents/Solubility Modifiers.

The present compositions may include a minor but effective amount of a secondary hardening agent, as for example, an amide such stearic monoethanolamide or lauric diethanolamide, or an alkylamide, and the like; a solid polyethylene glycol, or a solid EO/PO block copolymer, and the like; starches that have been made water-soluble through an acid or alkaline treatment process; various inorganics that impart solidifying properties to a heated composition upon cooling, and the like. Such compounds may also vary the solubility of the composition in an aqueous medium during use such that the cleaning agent and/or other active ingredients may be dispensed from the solid composition over an extended period of time. The composition may include a secondary hardening agent in an amount of about 0 to about 20 wt-% or about 10 to about 15 wt-%.

Detergent Fillers

A cleaning composition may include an effective amount of one or more of a detergent filler which does not perform as a cleaning agent per se, but cooperates with the cleaning agent to enhance the overall processability of the composition. Examples of fillers suitable for use in the present cleaning compositions include sodium sulfate, sodium chloride, starch, sugars, $C_1$-$C_{10}$ alkylene glycols such as propylene glycol, and the like. A filler such as a sugar (e.g. sucrose) can aid dissolution of a solid composition by acting as a disintegrant. A detergent filler can be included in an amount up to about 50 wt-%, of about 1 to about 20 wt-% about 3 to about 15 wt-%, about 1 to about 30 wt-%, or about 1.5 to about 25 wt-%.

Defoaming Agents

An effective amount of a defoaming agent for reducing the stability of foam may also be included in the present cleaning compositions. The cleaning composition can include about 0-10 wt-% of a defoaming agent, e.g., about 0.01-3 wt-%. The defoaming agent can be provided in an amount of about 0.0001% to about 10 wt-% about 0.001% to about 5 wt-%, or about 0.01% to about 1.0 wt-%

Examples of defoaming agents suitable for use in the present compositions include silicone compounds such as silica dispersed in polydimethylsiloxane, EO/PO block copolymers, alcohol alkoxylates, fatty amides, hydrocarbon waxes, fatty acids, fatty esters, fatty alcohols, fatty acid soaps, ethoxylates, mineral oils, polyethylene glycol esters, alkyl phosphate esters such as monostearyl phosphate, and the like. A discussion of defoaming agents may be found, for example, in U.S. Pat. No. 3,048,548 to Martin et al., U.S. Pat. No. 3,334,147 to Brunelle et al., and U.S. Pat. No. 3,442,242 to Rue et al., the disclosures of which are incorporated by reference herein.

Anti-redeposition Agents

A cleaning composition may also include an anti-redeposition agent capable of facilitating sustained suspension of soils in a cleaning solution and preventing the removed soils from being redeposited onto the substrate being cleaned. Examples of suitable anti-redeposition agents include fatty acid amides, fluorocarbon surfactants, complex phosphate esters, styrene maleic anhydride copolymers, and cellulosic derivatives such as hydroxyethyl cellulose, hydroxypropyl cellulose, and the like. A cleaning composition may include about 0 to about 10 wt-%, e.g., about 1 to about 5 wt-% of an anti-redeposition agent.

Optical Brighteners

Optical brightener is also referred to as fluorescent whitening agents or fluorescent brightening agents provide optical compensation for the yellow cast in fabric substrates. With optical brighteners yellowing is replaced by light emitted from optical brighteners present in the area commensurate in scope with yellow color. The violet to blue light supplied by the optical brighteners combines with other light reflected from the location to provide a substantially complete or enhanced bright white appearance. This additional light is produced by the brightener through fluorescence. Optical brighteners absorb light in the ultraviolet range 275 through 400 nm. and emit light in the ultraviolet blue spectrum 400-500 nm.

Fluorescent compounds belonging to the optical brightener family are typically aromatic or aromatic heterocyclic materials often containing condensed ring system. An important feature of these compounds is the presence of an uninterrupted chain of conjugated double bonds associated with an aromatic ring. The number of such conjugated double bonds is dependent on substituents as well as the planarity of the fluorescent part of the molecule. Most brightener compounds are derivatives of stilbene or 4,4'-diamino stilbene, biphenyl, five membered heterocycles (triazoles, oxazoles, imidazoles, etc.) or six membered heterocycles (cumarins, naphthalamides, triazines, etc.). The choice of optical brighteners for use in detergent compositions will depend upon a number of factors, such as the type of detergent, the nature of other components present in the detergent composition, the temperature of the wash water, the degree of agitation, and the ratio of the material washed to the tub size. The brightener selection is also dependent upon the type of material to be cleaned, e.g., cottons, synthetics, etc. Since most laundry detergent products are used to clean a variety of fabrics, the detergent compositions should contain a mixture of brighteners which are effective for a variety of fabrics. It is of course necessary that the individual components of such a brightener mixture be compatible.

Optical brighteners useful in the present invention are commercially available and will be appreciated by those skilled in the art. Commercial optical brighteners which may be useful in the present invention can be classified into subgroups, which include, but are not necessarily limited to, derivatives of stilbene, pyrazoline, coumarin, carboxylic acid, methinecyanines, dibenzothiophene-5,5-dioxide, azoles, 5- and 6-membered-ring heterocycles and other miscellaneous agents. Examples of these types of brighteners are disclosed in "The Production and Application of Fluorescent Brightening Agents", M. Zahradnik, Published by John Wiley & Sons, New York (1982), the disclosure of which is incorporated herein by reference.

Stilbene derivatives which may be useful in the present invention include, but are not necessarily limited to, derivatives of bis(triazinyl)amino-stilbene; bisacylamino derivatives of stilbene; triazole derivatives of stilbene; oxadiazole derivatives of stilbene; oxazole derivatives of stilbene; and styryl derivatives of stilbene.

For laundry cleaning or sanitizing compositions, suitable optical brighteners include stilbene derivatives, which can be employed at concentrations of up to 1 wt-%.

Stabilizing Agents

The solid detergent composition may also include a stabilizing agent. Examples of suitable stabilizing agents include, but are not limited to: borate, calcium/magnesium ions, propylene glycol, and mixtures thereof. The composition need not include a stabilizing agent, but when the composition includes a stabilizing agent, it can be included in an amount that provides the desired level of stability of the composition. Suitable ranges of the stabilizing agent include up to about 20 wt-%, about 0.5 to about 15 wt-%, or about 2 to about 10 wt-%.

Dispersants

The solid detergent composition may also include a dispersant. Examples of suitable dispersants that can be used in the solid detergent composition include, but are not limited to: maleic acid/olefin copolymers, polyacrylic acid, and mixtures thereof. The composition need not include a dispersant, but when a dispersant is included it can be included in an amount that provides the desired dispersant properties. Suitable ranges of the dispersant in the composition can be up to about 20 wt-%, about 0.5 to about 15 wt-%, or about 2 to about 9 wt-%.

Enzymes

Enzymes that can be included in the solid detergent composition include those enzymes that aid in the removal of starch and/or protein stains. Suitable types of enzymes include, but are not limited to: proteases, alpha-amylases, and mixtures thereof. Suitable proteases that can be used include, but are not limited to: those derived from *Bacillus lichenifor-*

*mix, Bacillus lenus, Bacillus alcalophilus*, and *Bacillus amyloliquefacins*. Suitable alpha-amylases include *Bacillus subtilis, Bacillus amyloliquefaciens*, and *Bacillus licheniformis*. The composition need not include an enzyme, but when the composition includes an enzyme, it can be included in an amount that provides the desired enzymatic activity when the solid detergent composition is provided as a use composition. Suitable ranges of the enzyme in the composition include up to about 15 wt-%, about 0.5 to about 10 wt-%, or about 1 to about 5 wt-%.

Thickeners

The solid detergent compositions can include a rheology modifier or a thickener. The rheology modifier may provide the following functions: increasing the viscosity of the compositions; increasing the particle size of liquid use solutions when dispensed through a spray nozzle; providing the use solutions with vertical cling to surfaces; providing particle suspension within the use solutions; or reducing the evaporation rate of the use solutions.

The rheology modifier may provide a use composition that is pseudo plastic, in other words the use composition or material when left undisturbed (in a shear mode), retains a high viscosity. However, when sheared, the viscosity of the material is substantially but reversibly reduced. After the shear action is removed, the viscosity returns. These properties permit the application of the material through a spray head. When sprayed through a nozzle, the material undergoes shear as it is drawn up a feed tube into a spray head under the influence of pressure and is sheared by the action of a pump in a pump action sprayer. In either case, the viscosity can drop to a point such that substantial quantities of the material can be applied using the spray devices used to apply the material to a soiled surface. However, once the material comes to rest on a soiled surface, the materials can regain high viscosity to ensure that the material remains in place on the soil. In an embodiment, the material can be applied to a surface resulting in a substantial coating of the material that provides the cleaning components in sufficient concentration to result in lifting and removal of the hardened or baked-on soil. While in contact with the soil on vertical or inclined surfaces, the thickeners in conjunction with the other components of the cleaner minimize dripping, sagging, slumping or other movement of the material under the effects of gravity. The material should be formulated such that the viscosity of the material is adequate to maintain contact substantial quantities of the film of the material with the soil for at least a minute, five minutes or more.

Examples of suitable thickeners or rheology modifiers are polymeric thickeners including, but not limited to: polymers or natural polymers or gums derived from plant or animal sources. Such materials may be polysaccharides such as large polysaccharide molecules having substantial thickening capacity. Thickeners or rheology modifiers also include clays.

A substantially soluble polymeric thickener can be used to provide increased viscosity or increased conductivity to the use compositions. Examples of polymeric thickeners for the aqueous compositions of the invention include, but are not limited to: carboxylated vinyl polymers such as polyacrylic acids and sodium salts thereof, ethoxylated cellulose, polyacrylamide thickeners, cross-linked, xanthan compositions, sodium alginate and algin products, hydroxypropyl cellulose, hydroxyethyl cellulose, and other similar aqueous thickeners that have some substantial proportion of water solubility. Examples of suitable commercially available thickeners include, but are not limited to: Acusol, available from Rohm & Haas Company, Philadelphia, Pa.; and Carbopol, available from B.F. Goodrich, Charlotte, N.C.

Examples of suitable polymeric thickeners include, but not limited to: polysaccharides. An example of a suitable commercially available polysaccharide includes, but is not limited to, Diutan, available from Kelco Division of Merck, San Diego, Calif. Thickeners for use in the solid detergent compositions further include polyvinyl alcohol thickeners, such as, fully hydrolyzed (greater than 98.5 mol acetate replaced with the —OH function).

An example of a suitable polysaccharide includes, but is not limited to, xanthans. Such xanthan polymers are suitable due to their high water solubility, and great thickening power. Xanthan is an extracellular polysaccharide of *Xanthomonas campestras*. Xanthan may be made by fermentation based on corn sugar or other corn sweetener by-products. Xanthan includes a poly beta-(1-4)-D-Glucopyranosyl backbone chain, similar to that found in cellulose. Aqueous dispersions of xanthan gum and its derivatives exhibit novel and remarkable rheological properties. Low concentrations of the gum have relatively high viscosities which permit it to be used economically. Xanthan gum solutions exhibit high pseudo plasticity, i.e. over a wide range of concentrations, rapid shear thinning occurs that is generally understood to be instantaneously reversible. Non-sheared materials have viscosities that appear to be independent of the pH and independent of temperature over wide ranges. Suitable xanthan materials include crosslinked xanthan materials. Xanthan polymers can be crosslinked with a variety of known covalent reacting crosslinking agents reactive with the hydroxyl functionality of large polysaccharide molecules and can also be crosslinked using divalent, trivalent or polyvalent metal ions. Such crosslinked xanthan gels are disclosed in U.S. Pat. No. 4,782,901, which is herein incorporated by reference. Suitable crosslinking agents for xanthan materials include, but are not limited to: metal cations such as $Al^{+3}$, $Fe^{+3}$, $Sb^{+3}$, $Zr^{+4}$ and other transition metals. Examples of suitable commercially available xanthans include, but are not limited to: KELTROL®, KELZAN®AR, KELZAN® D35, KELZAN® S, KELZAN® XZ, available from Kelco Division of Merck, San Diego, Calif. Known organic crosslinking agents can also be used. A suitable crosslinked xanthan is KELZAN® AR, which provides a pseudo plastic use solution that can produce large particle size mist or aerosol when sprayed.

The thickener can be in the present solid composition at amounts of about 0 to about 10 wt-%, about 0.5 to about 5 wt-%, or about 1 wt-% to about 3 wt-%.

Dyes/Odorants

Various dyes, odorants including perfumes, and other aesthetic enhancing agents may also be included in the composition. Dyes may be included to alter the appearance of the composition, as for example, Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keyston Analine and Chemical), Metanil Yellow (Keystone Analine and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), Acid Green 25 (Ciba-Geigy), and the like.

Fragrances or perfumes that may be included in the compositions include, for example, terpenoids such as citronellol, aldehydes such as amyl cinnamaldehyde, a jasmine such as ClS-jasmine or jasmal, vanillin, and the like.

The dye or odorant can be in the present solid composition at amounts of about 0 to about 4 wt-%, about 0.1 to about 1 wt-%, Adjuvants and other additive ingredients will vary according to the type of composition being manufactured, and the intended end use of the composition. In certain embodiments, the composition includes as an additive one or more of cleaning enzyme, detersive polymer, antimicrobial, activators for the source of alkalinity, or mixtures thereof.

Use Compositions

The compositions of the present invention comprising water soluble magnesium salt can be provided in the form of a concentrate or a use solution. In general, a concentrate refers to a composition that is intended to be diluted with water to provide a use solution that contacts an object to provide the desired cleaning, rising, or the like. In an embodiment, when the composition is provided as a concentrate, the concentrate includes between about 100 parts per million (ppm) to about 5000 ppm cleaning composition including water soluble magnesium salt. The use solution can include additional functional ingredients at a level suitable for cleaning, rinsing, or the like. In an embodiment, the use solution includes additional functional ingredients at about 0 to about 0.75 wt-%.

A use solution may be prepared from the concentrate by diluting the concentrate with water at a dilution ratio that provides a use solution having desired detersive properties. In an exemplary embodiment, the concentrate may be diluted at a weight ratio of diluent to concentrate of at least about 20:1 or about 20:1 to about 2000:1. In an embodiment, when the detergent composition is provided as a use solution, the use solution includes about 0.1 to about 200 ppm cleaning composition including water soluble magnesium salt or about 1 to about 100 ppm cleaning composition including water soluble magnesium salt. In an embodiment, the use solution includes about 3 to about 75 ppm cleaning composition including water soluble magnesium salt.

The concentrate may be diluted with water at the location of use to provide the use solution. When the detergent composition is used in an automatic warewashing or dishwashing machine, it is expected that that the location of use will be inside the automatic warewashing machine. For example, when the detergent composition is used in a residential warewashing machine, the composition may be placed in the detergent compartment of the warewashing machine. Depending on the machine, the detergent may be provided in a unit dose form or in a multi-use form. In larger warewashing machines, a large quantity of detergent composition may be provided in a compartment that allows for the release of a single dose amount of the detergent composition for each wash cycle. Such a compartment may be provided as part of the warewashing machine or as a separate structure connected to the warewashing machine. For example, a block of the detergent composition may be provided in a hopper and introduced into the warewashing machine when water is sprayed against the surface of the block to provide a liquid concentrate.

The detergent composition may also be dispensed from a spray-type dispenser. Briefly, a spray-type dispenser functions by impinging a water spray upon an exposed surface of the detergent composition to dissolve a portion of the detergent composition, and then immediately directing the use solution out of the dispenser to a storage reservoir or directly to a point of use. When used, the product may be removed from the packaging (e.g. film) and inserted into the dispenser. The spray of water may be made by a nozzle in a shape that conforms to the shape of the solid detergent composition. The dispenser enclosure may also closely fit the shape of the detergent composition to prevent introducing and dispensing an incorrect detergent composition.

Solid Cleaning Compositions

In some embodiments, the present invention also relates to solid cleaning compositions comprising water soluble magnesium salt. For example, the present invention includes a cast solid block of the cleaning composition including water soluble magnesium salt. By way of further example, the present invention includes compositions comprising a pressed solid block or puck of the cleaning composition comprising water soluble magnesium salt.

According to the present invention, a solid cleaning composition comprising water soluble magnesium salt can be prepared by a method including: providing a powder or crystalline form of cleaning composition including water soluble magnesium salt; melting the powder or crystalline form of the cleaning composition including water soluble magnesium salt; transferring the molten cleaning composition including water soluble magnesium salt into a mold; and cooling the molten composition to solidify it.

According to the present invention, a solid cleaning composition comprising water soluble magnesium salt can be prepared by a method including: providing a powder or crystalline form of a cleaning composition including water soluble magnesium salt; gently pressing the calcium magnesium gluconate to form a solid (e.g., block or puck).

A solid cleaning or rinsing composition as used in the present disclosure encompasses a variety of forms including, for example, solids, pellets, blocks, and tablets, but not powders. It should be understood that the term "solid" refers to the state of the detergent composition under the expected conditions of storage and use of the solid cleaning composition. In general, it is expected that the detergent composition will remain a solid when provided at a temperature of up to about 100° F. or greater than 120° F.

In certain embodiments, the solid cleaning composition is provided in the form of a unit dose. A unit dose refers to a solid cleaning composition unit sized so that the entire unit is used during a single washing cycle. When the solid cleaning composition is provided as a unit dose, it can have a mass of about 1 g to about 50 g. In other embodiments, the composition can be a solid, a pellet, or a tablet having a size of about 50 g to 250 g, of about 100 g or greater, or about 40 g to about 11,000 g.

In other embodiments, the solid cleaning composition is provided in the form of a multiple-use solid, such as, a block or a plurality of pellets, and can be repeatedly used to generate aqueous detergent compositions for multiple washing cycles. In certain embodiments, the solid cleaning composition is provided as a solid having a mass of about 5 g to 10 kg. In certain embodiments, a multiple-use form of the solid cleaning composition has a mass of about 1 to 10 kg. In further embodiments, a multiple-use form of the solid cleaning composition has a mass of about 5 kg to about 8 kg. In other embodiments, a multiple-use form of the solid cleaning composition has a mass of about 5 g to about 1 kg, or about 5 g and to 500 g.

Packaging System

In some embodiments, the solid composition can be packaged. The packaging receptacle or container may be rigid or flexible, and composed of any material suitable for containing the compositions produced according to the invention, as for example glass, metal, plastic film or sheet, cardboard, cardboard composites, paper, and the like.

Advantageously, since the composition is processed at or near ambient temperatures, the temperature of the processed mixture is low enough so that the mixture may be formed directly in the container or other packaging system without structurally damaging the material. As a result, a wider variety of materials may be used to manufacture the container than those used for compositions that processed and dispensed under molten conditions.

Suitable packaging used to contain the compositions is manufactured from a flexible, easy opening film material.

Dispensing of the Processed Compositions

The solid cleaning composition according to the present invention can be dispensed in any suitable method generally known. The cleaning or rinsing composition can be dispensed from a spray-type dispenser such as that disclosed in U.S. Pat. Nos. 4,826,661, 4,690,305, 4,687,121, 4,426,362 and in U.S. Pat. Nos. Re 32,763 and 32,818, the disclosures of which are incorporated by reference herein. Briefly, a spray-type dispenser functions by impinging a water spray upon an exposed surface of the solid composition to dissolve a portion of the composition, and then immediately directing the concentrate solution including the composition out of the dispenser to a storage reservoir or directly to a point of use. When used, the product is removed from the package (e.g.) film and is inserted into the dispenser. The spray of water can be made by a nozzle in a shape that conforms to the solid shape. The dispenser enclosure can also closely fit the detergent shape in a dispensing system that prevents the introduction and dispensing of an incorrect detergent. The aqueous concentrate is generally directed to a use locus.

In an embodiment, the present composition can be dispensed by immersing either intermittently or continuously in water. The composition can then dissolve, for example, at a controlled or predetermined rate. The rate can be effective to maintain a concentration of dissolved cleaning agent that is effective for cleaning.

In an embodiment, the present composition can be dispensed by scraping solid from the solid composition and contacting the scrapings with water. The scrapings can be added to water to provide a concentration of dissolved cleaning agent that is effective for cleaning.

Methods Employing the Present Compositions

It is contemplated that the cleaning compositions of the invention can be used in a broad variety of industrial, household, health care, vehicle care, and other such applications. Some examples include surface disinfectant, ware cleaning, laundry cleaning, laundry sanitizing, vehicle cleaning, floor cleaning, surface cleaning, pre-soaks, clean in place, and a broad variety of other such applications.

In some embodiments, the present method employs water that wasn't treated with a polymeric water softener bed such as in use today and which requires periodic regeneration with sodium chloride to work.

In some aspects, the present invention relates to a method of cleaning an object, comprising contacting the object with an aqueous composition comprising water, a water soluble magnesium salt, and an ingredient selected from the group consisting of source of alkalinity, and surfactant, and a mixture thereof. This composition can be substantially free of chelating agents and/or threshold agents.

During contacting, the aqueous composition can include magnesium ion in a molar amount equal to or in excess over a molar amount of calcium ion. The method can also include recovering the object with an acceptable amount of hard water spotting, scaling, or deposits. As used herein, an acceptable amount of hard water spotting in a warewash test, refers to a test method were the results are good for a rating of 1-2 marginal at a rating of 3 and fail for 4-5. The table below summarizes the rating system used.

| Rating | Spots | Film |
|---|---|---|
| 1 | No spots | No film |
| 2 | ¼ glass spotted | Trace/barely perceptible |
| 3 | ½ glass spotted | Slight film |
| 4 | ¾ glass spotted | Moderate film |
| 5 | Whole glass spotted | Heavy film |

The method can reduce any of a variety of detrimental effects of hard water. In an embodiment, the method can reduce precipitation of calcium salt. In an embodiment, the method can reduce scaling.

In an embodiment, the aqueous composition containing excess calcium ion contains at least about 50 ppm calcium ion, e.g. at least about 5 grain per gallon of hardness due to calcium ion. In an embodiment of this method, adding includes adding the water soluble magnesium compound to achieve a total wt-% of magnesium ion of about half the wt-% of calcium ion. For example, at least about 2 grains of total magnesium ion for water containing 5 grains of calcium ion as water hardness. In an embodiment of this method, adding includes adding water soluble magnesium compound including an anion that forms a soluble salt with calcium (e.g., $MgCl_2$) to achieve a total wt-% of magnesium ion of greater than about half the wt-% of calcium ion (which is about a 1:1 molar ratio). In an embodiment of this method, adding includes adding water soluble magnesium compound including an anion that forms an insoluble salt with calcium (e.g., $MgSO_4$) to achieve a total wt-% of magnesium ion of about the wt-% of calcium ion (which is about a 2:1 molar ratio).

Contacting can include any of numerous methods for applying a composition, such as spraying the composition, immersing the object in the composition, or a combination thereof. The compositions can be applied in a variety of areas including kitchens, bathrooms, factories, hospitals, dental offices and food plants, and can be applied to a variety of hard surfaces having smooth, irregular or porous topography. A use concentration of a composition of the present invention can be applied to or brought into contact with an object by any conventional method or apparatus for applying a cleaning composition to an object. For example, the object can be wiped with, sprayed with, and/or immersed in the composition, or a use solution made from the composition. The composition can be sprayed, or wiped onto a surface; the composition can be caused to flow over the surface, or the surface can be dipped into the composition. Contacting can be manual or by machine.

Exemplary articles that can be treated, i.e., cleaned, with the use solution comprising a detersive composition and treated water include, but are not limited to motor vehicle exteriors, textiles, food contacting articles, clean-in-place (CIP) equipment, health care surfaces and hard surfaces. Exemplary motor vehicle exteriors include cars, trucks, trailers, buses, etc. that are commonly washed in commercial vehicle washing facilities. Exemplary textiles include, but are not limited to, those textiles that generally are considered within the term "laundry" and include clothes, towels, sheets, etc. In addition, textiles include curtains. Exemplary food contacting articles include, but are not limited to, dishes, glasses, eating utensils, bowls, cooking articles, food storage articles, etc. Exemplary CIP equipment includes, but is not limited to, pipes, tanks, heat exchangers, valves, distribution circuits, pumps, etc. Exemplary health care surfaces include, but are not limited to, surfaces of medical or dental devices or instruments. Exemplary hard surfaces include, but are not limited to, floors, counters, glass, walls, etc. Hard surfaces can also include the inside of dish machines, and laundry machines. In general, hard surfaces can include those surfaces commonly referred to in the cleaning industry as environmental surfaces. Such hard surfaces can be made from a variety of materials including, for example, ceramic, metal, glass, wood or hard plastic.

The present invention may be better understood with reference to the following examples. These examples are intended to be representative of specific embodiments of the invention, and are not intended as limiting the scope of the invention.

EXAMPLES

Example 1

Water Soluble Magnesium Compounds Reduce Precipitation of Calcium Salts from Hard Water This Example demonstrates that adding a hardness ion ($Mg^{2+}$) to water worked as well as a conventional chelating agent or sequestrant (sodium tripolyphosphate (STPP)) at preventing precipitation of calcium salts.

Formation of a precipitate in water reduces the transmission of visible light through the water. A transmittance of 100% indicates that no precipitate formed, while a transmittance of 0% indicates that so much precipitate formed that light no longer passed through the sample. Transmittance was measured for water containing either $MgCl_2$ (present invention) or STPP (comparative example) at pH values of about 8, about 10, and about 12, and at temperatures of about 20° C., about 45° C., and about 70° C. Temperatures were chosen in an attempt to reflect room temperature (20° C.), general laundry temperature (45° C.) and general automatic warewashing temperature (70° C.). The results are reported in FIGS. 1-6 and the Tables below.

The graphs in FIGS. 1-6, which each have an x, y, and z axis. The x-axis is a measure of the molar ratio of calcium to builder, e.g., STPP or water soluble magnesium compound. The y-axis is a measure of the level of light transmittance thru the samples with 0% being no light transmitted and 100% being the entire beam of light transmitted. Full or partial loss of transmittance occurs as a consequence of the presence of particulate formation in the initially clear samples. An effective builder prevents or reduces precipitation resulting in a clear sample. The z-axis is a measure of the test temperature, ranging from 20-60° C.

FIG. 1 is illustrative of a comparative example. FIG. 1 is a plot of the performance of STPP as a builder in the presence of various levels of calcium, at various temperatures, and at a constant pH of 8 and illustrating the impact of Ca/builder ratio and temperature on the building performance of STPP. Data for FIG. 1 is provided in the table below (Table 6). Generally, the plot of FIG. 1 shows that STPP is a good chelating agent and as expected as the concentration of calcium ions increases and as the temperature increases, STPP has decreasing effectiveness in chelating calcium ions as reflected in the reduction in the transmittance of the samples.

TABLE 6

| pH | T (C.) | ppm CaCO3 | % Transmittance | Ca/STPP (wt) | Ca/STPP (molar) |
|---|---|---|---|---|---|
| 8 | 20 | 50 | 100 | 0.07 | 0.61 |
| 8 | 20 | 300 | 81.1 | 0.40 | 3.68 |
| 8 | 20 | 600 | 67.4 | 0.80 | 7.36 |

TABLE 6-continued

| pH | T (C.) | ppm CaCO3 | % Transmittance | Ca/STPP (wt) | Ca/STPP (molar) |
|---|---|---|---|---|---|
| 8 | 45 | 50 | 99.2 | 0.07 | 0.61 |
| 8 | 45 | 300 | 72.6 | 0.40 | 3.68 |
| 8 | 45 | 600 | 64.1 | 0.80 | 7.36 |
| 8 | 70 | 50 | 99.1 | 0.07 | 0.61 |
| 8 | 70 | 300 | 41.3 | 0.40 | 3.68 |
| 8 | 70 | 600 | 41.5 | 0.80 | 7.36 |

Figure 2:
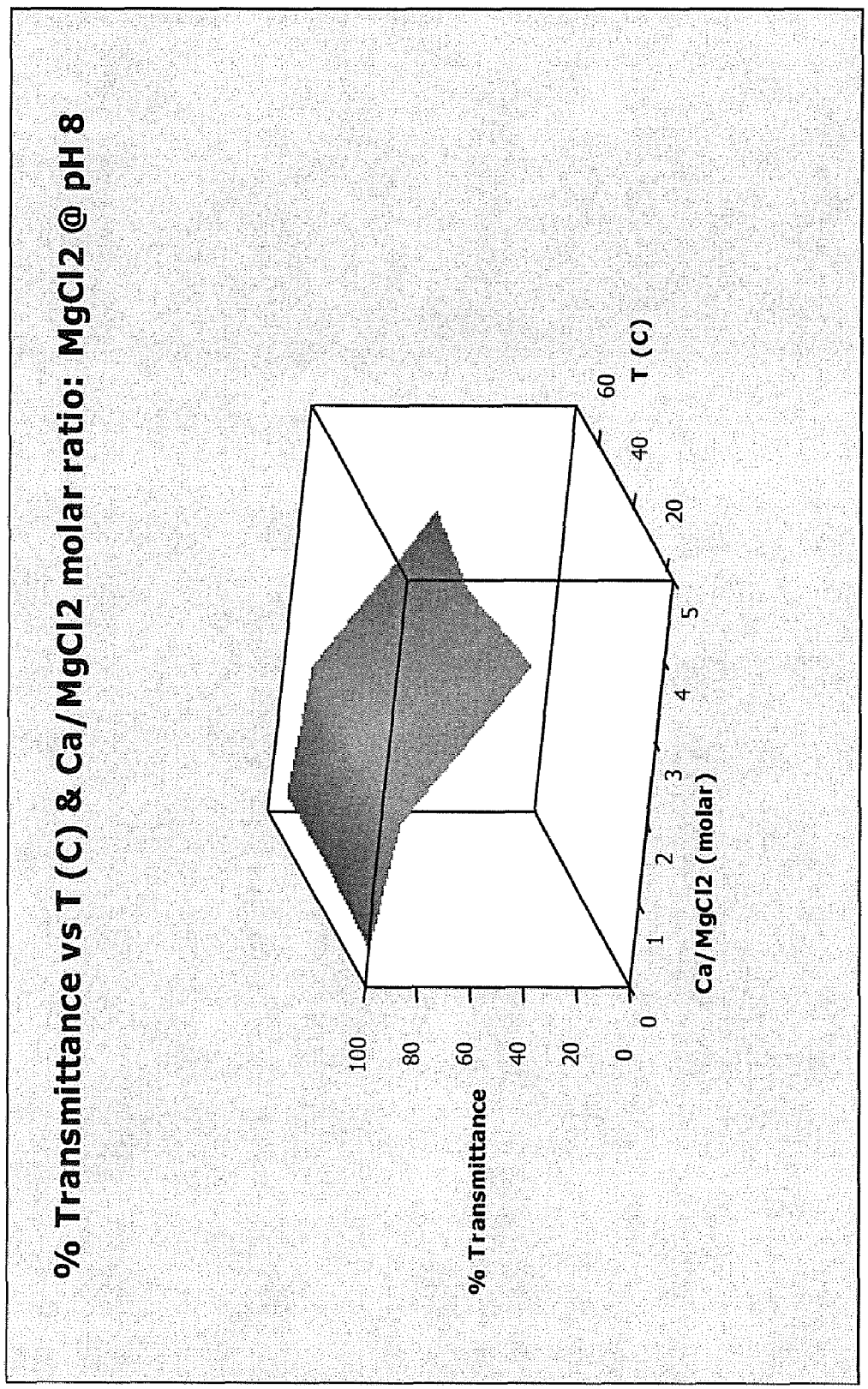

FIG. 2 is illustrative of the invention. FIG. 2 is a plot of the performance of magnesium chloride in preventing precipitation in the presence of various levels of calcium, at various temperatures, and at a constant pH of 8. Data for FIG. 2 is provided in the table below (Table 7). This graph shows that a water soluble salt of magnesium (e.g., magnesium chloride) was unexpectedly capable of controlling the precipitation of water hardness even at a neutral pH. Generally, the plot of FIG. 2 shows that magnesium chloride is a good chelating agent and as the concentration of calcium ions increases and as the temperature increases, magnesium chloride has decreasing effectiveness in chelating calcium ions as reflected in the reduction in the transmittance of the samples. The results shown in FIG. 2 are surprisingly consistent with that shown in the comparative FIG. 1.

TABLE 7

| pH | T (C.) | ppm CaCO3 | % Transmittance | Ca/MgCl$_2$ (wt) | Ca/MgCl$_2$ (molar) |
|---|---|---|---|---|---|
| 8 | 20 | 50 | 98.1 | 0.07 | 0.32 |
| 8 | 20 | 300 | 91.1 | 0.40 | 1.90 |
| 8 | 20 | 600 | 48 | 0.80 | 3.81 |
| 8 | 45 | 50 | 96.2 | 0.07 | 0.32 |
| 8 | 45 | 300 | 92.3 | 0.40 | 1.90 |
| 8 | 45 | 600 | 55.8 | 0.80 | 3.81 |
| 8 | 70 | 50 | 96.3 | 0.07 | 0.32 |
| 8 | 70 | 300 | 92.3 | 0.40 | 1.90 |
| 8 | 70 | 600 | 50.9 | 0.80 | 3.81 |

Figure 3:
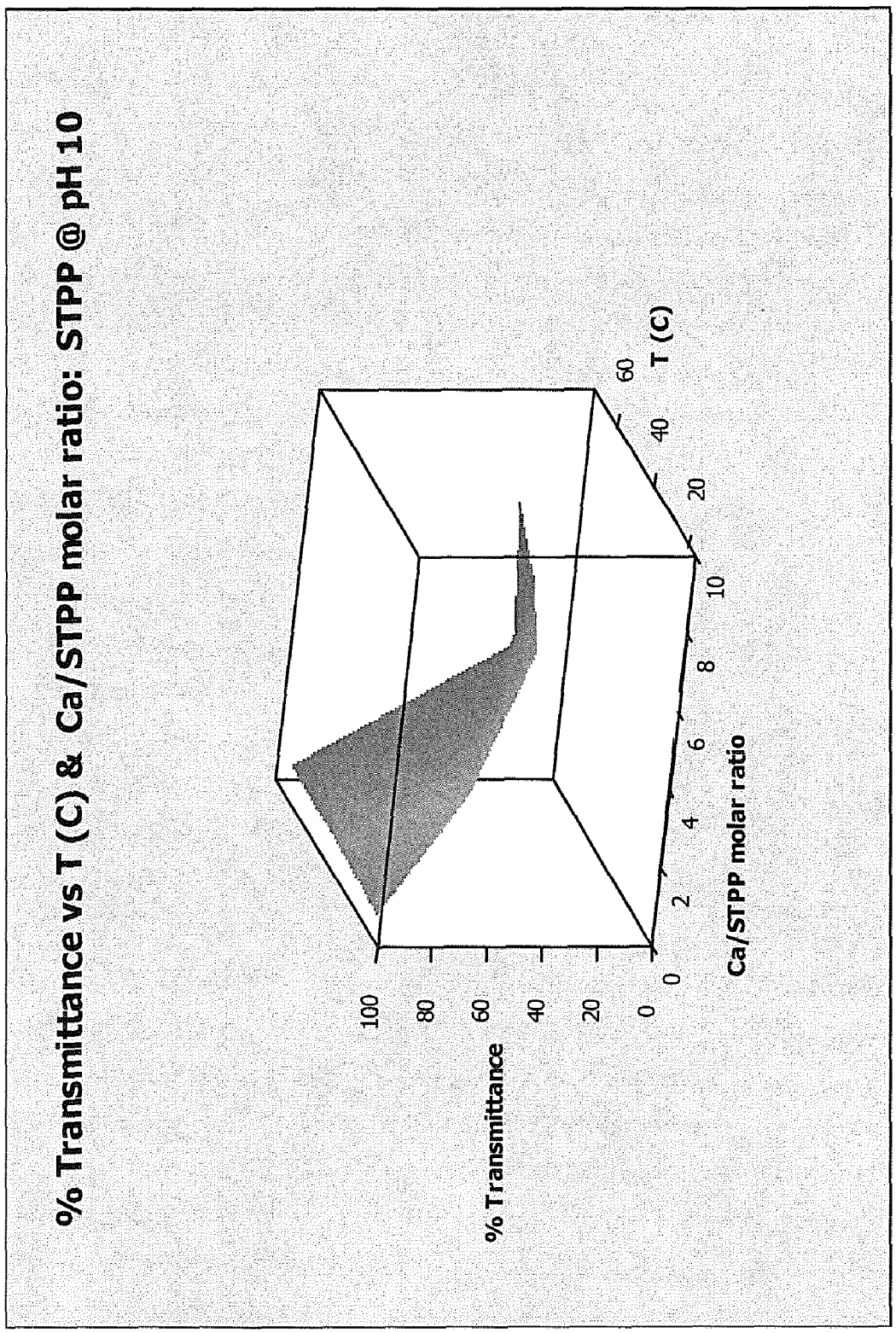

FIG. 3 is a plot illustrative of a comparative example. FIG. 3 shows the performance of STPP as a builder in the presence of various levels of calcium, at various temperatures, and at a constant pH of 10. Data for FIG. 3 is provided in the table below (Table 8). A comparison of this graph with the results obtained at pH 8 (FIG. 1) shows that the increased alkalinity gives reduced building performance at elevated temperatures, particularly around 60° C.

TABLE 8

| pH | Temp (° C.) | Ppm CaCO$_3$ | % Transmittance | Ca/STTP (wt) | Ca/STPP (molar) |
|---|---|---|---|---|---|
| 10 | 20 | 50 | 99.7 | 0.07 | 0.61 |
| 10 | 20 | 300 | 70.6 | 0.40 | 3.68 |
| 10 | 20 | 600 | 51.2 | 0.80 | 7.36 |
| 10 | 45 | 50 | 98.5 | 0.07 | 0.61 |
| 10 | 45 | 300 | 49.9 | 0.40 | 3.68 |
| 10 | 45 | 600 | 36.8 | 0.80 | 7.36 |
| 10 | 70 | 50 | 98.2 | 0.07 | 0.61 |
| 10 | 70 | 300 | 22.4 | 0.40 | 3.68 |
| 10 | 70 | 600 | 26 | 0.80 | 7.36 |

Figure 4:
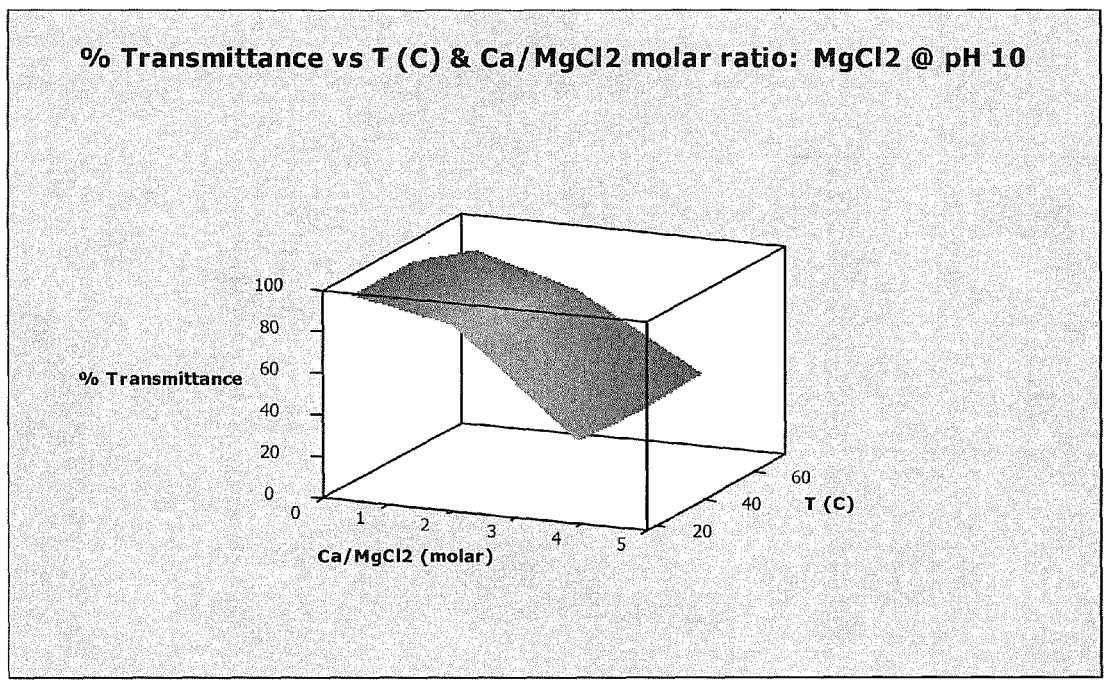

FIG. 4 is a plot illustrative of the invention. FIG. 4 shows the performance of magnesium chloride in preventing precipitation in the presence of various levels of calcium, at various temperatures, and at a constant pH of 10. Data for FIG. 4 is provided in the table below (Table 9). This graph shows that a water soluble salt of magnesium (e.g., magnesium chloride) was unexpectedly capable of controlling the precipitation of water hardness even at a basic pH. The increased alkalinity did not significantly affect the degree of calcium precipitation compared to pH 8 (FIG. 2). This is unexpected.

TABLE 9

| pH | T (° C.) | ppm CaCO3 | % Transmittance | Ca/MgCl$_2$ (wt) | Ca/MgCl$_2$ (molar) |
|---|---|---|---|---|---|
| 10 | 20 | 50 | 97.4 | 0.07 | 0.32 |
| 10 | 20 | 300 | 87.8 | 0.40 | 1.90 |
| 10 | 20 | 600 | 37.6 | 0.80 | 3.81 |
| 10 | 45 | 50 | 96.5 | 0.07 | 0.32 |
| 10 | 45 | 300 | 81.1 | 0.40 | 1.90 |
| 10 | 45 | 600 | 35.4 | 0.80 | 3.81 |
| 10 | 70 | 50 | 86.1 | 0.07 | 0.32 |
| 10 | 70 | 300 | 72.4 | 0.40 | 1.90 |
| 10 | 70 | 600 | 38.1 | 0.80 | 3.81 |
| 10 | 45 | 300 | 79.9 | 0.40 | 1.90 |
| 10 | 45 | 300 | 82 | 0.40 | 1.90 |
| 10 | 45 | 300 | 81.4 | 0.40 | 1.90 |

Figure 5:
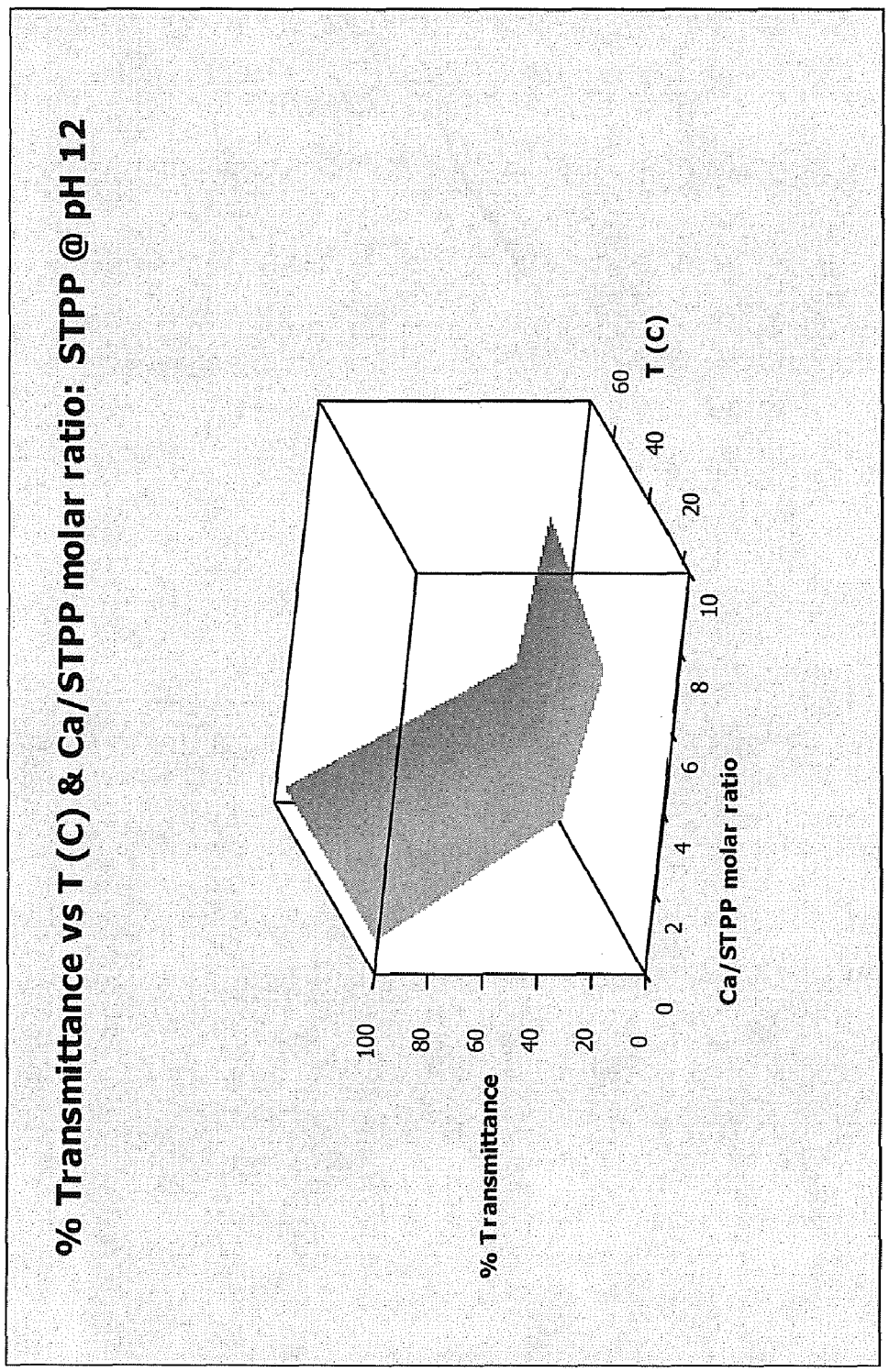

FIG. 5 is a plot illustrative of a comparative example. FIG. 5 shows the performance of STPP as a builder in the presence of various levels of calcium, at various temperatures, and at a constant pH of 12. Data for FIG. 5 is provided in the table below (Table 10). This graph shows that STPP has quit working to control calcium precipitation at molar ratios of 4 Ca/STPP and higher with light transmittance dropping down to about 20%. Once again, elevated temperatures make the STPP system more sensitive to water hardness.

TABLE 10

| pH | Temp (° C.) | Ppm CaCO$_3$ | % Transmittance | Ca/STTP (wt) | Ca/STPP (molar) |
|---|---|---|---|---|---|
| 12 | 20 | 50 | 98.8 | 0.07 | 0.61 |
| 12 | 20 | 300 | 35.4 | 0.40 | 3.68 |
| 12 | 20 | 600 | 25.5 | 0.80 | 7.36 |
| 12 | 45 | 50 | 99.2 | 0.07 | 0.61 |
| 12 | 45 | 300 | 26.4 | 0.40 | 3.68 |
| 12 | 45 | 600 | 19.7 | 0.80 | 7.36 |
| 12 | 70 | 50 | 100 | 0.07 | 0.61 |
| 12 | 70 | 300 | 20.3 | 0.40 | 3.68 |
| 12 | 70 | 600 | 13.4 | 0.80 | 7.36 |

Figure 6:
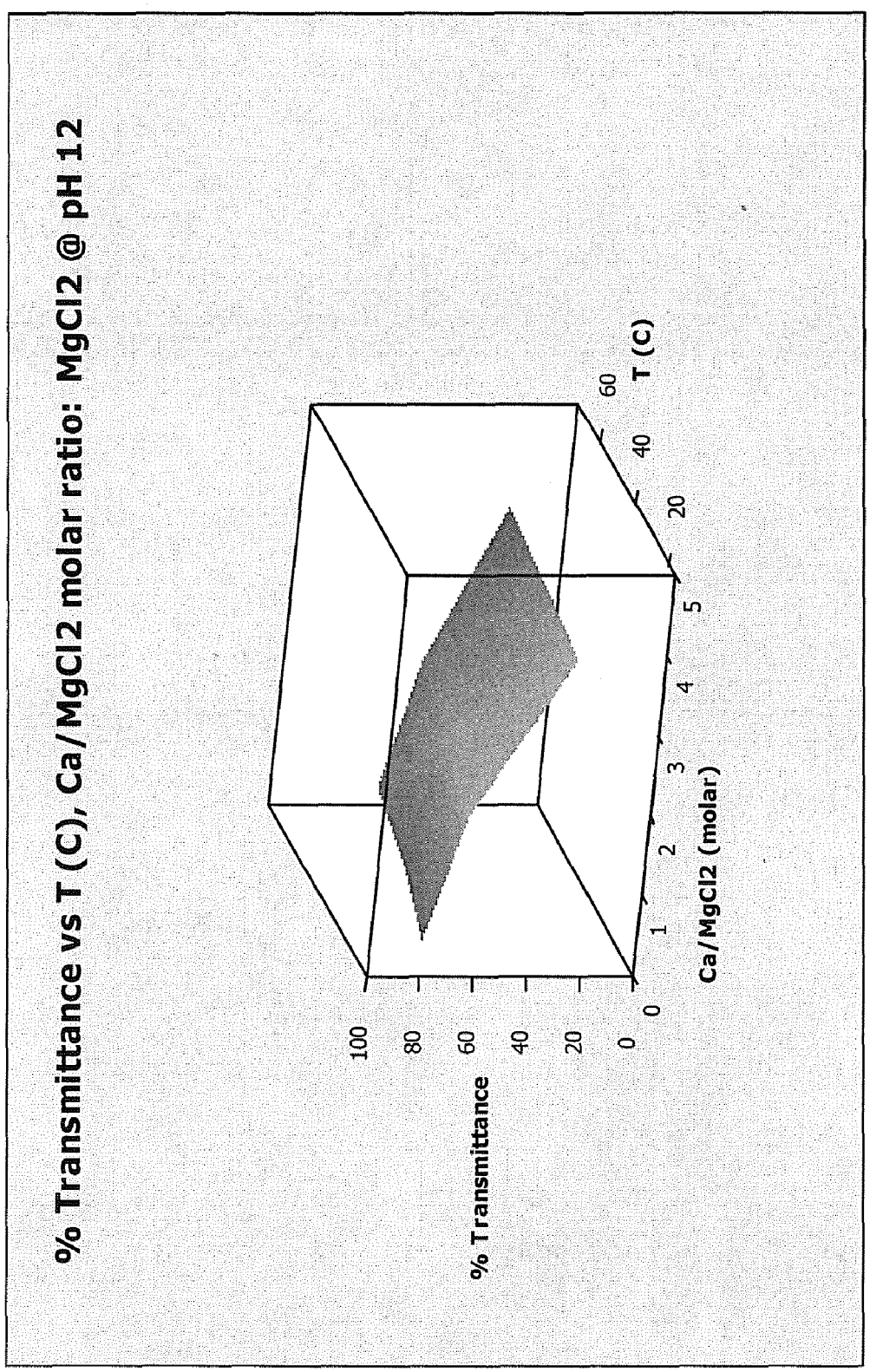

FIG. 6 is illustrative of the invention. The data for FIG. 6 is shown in the table below (Table 11). FIG. 6 shows a plot of the performance of magnesium chloride in preventing precipitation in the presence of various levels of calcium, at various temperatures, and at a constant pH of 12. A comparison of this graph with FIG. 5 shows that under very alkaline conditions a water soluble magnesium compound such as magnesium chloride is comparable to STPP in controlling water hardness

TABLE 11

| pH | T (° C.) | ppm CaCO3 | % Transmittance | Ca/MgCl$_2$ (wt) | Ca/MgCl$_2$ (molar) |
|---|---|---|---|---|---|
| 12 | 20 | 50 | 78.9 | 0.07 | 0.32 |
| 12 | 20 | 300 | 65.9 | 0.40 | 1.90 |
| 12 | 20 | 600 | 30.9 | 0.80 | 3.81 |
| 12 | 45 | 50 | 69 | 0.07 | 0.32 |
| 12 | 45 | 300 | 57.6 | 0.40 | 1.90 |
| 12 | 45 | 600 | 27.6 | 0.80 | 3.81 |
| 12 | 70 | 50 | 62.9 | 0.07 | 0.32 |
| 12 | 70 | 300 | 51.1 | 0.40 | 1.90 |
| 12 | 70 | 600 | 24.7 | 0.80 | 3.81 |

TABLE 11-continued

| pH | T (° C.) | ppm CaCO3 | % Transmittance | Ca/MgCl$_2$ (wt) | Ca/MgCl$_2$ (molar) |
|---|---|---|---|---|---|

As can be seen in FIGS. 1-6, magnesium chloride matched or exceeded the ability of STPP to soften water under most conditions. By matched or exceeded the ability we mean that the magnesium chloride reduced lime scale (as reflected by percent transmittance) to a level comparable to or lower than that achieved with STPP, e.g., for most molar ratios of calcium and builder. In particular, the performance of magnesium chloride at pH values of 8 and 10 exceeded the performance of STPP at all temperature values.

At a pH value of 12, magnesium chloride started at about 80% transmittance, but had a lower slope compared to STPP. The lower slope indicates better control of water hardness precipitation as the ratio of calcium/builder increased.

The data obtained for sodium citrate with water soluble magnesium salt is shown in the Table below and in FIGS. 7-9.

TABLE 12

| Water Hardness | % Transmittance | Builder | pH |
|---|---|---|---|
| Temperature: 20° C. | | | |
| 50 | 100.0 | 3 citrate/1 Mg* | 8 |
| 300 | 100 | 3 citrate/1 Mg* | 8 |
| 600 | 99.5 | 3 citrate/1 Mg* | 8 |
| 50 | 99.0 | citrate | 8 |
| 300 | 72.6 | citrate | 8 |
| 600 | 90.8 | citrate | 8 |
| 600 | 48 | Mg | 8 |
| 300 | 91.1 | Mg | 8 |
| 50 | 98.1 | Mg | 8 |
| 50 | 100.0 | 3 citrate/1 Mg | 10 |
| 300 | 100 | 3 citrate/1 Mg | 10 |
| 600 | 82.1 | 3 citrate/1 Mg | 10 |
| 50 | 99.2 | citrate | 10 |
| 300 | 53.4 | citrate | 10 |
| 600 | 91.1 | citrate | 10 |
| 50 | 97.4 | Mg | 10 |
| 300 | 87.8 | Mg | 10 |
| 600 | 37.6 | Mg | 10 |
| 50 | 99.8 | 3 citrate/1 Mg | 12 |
| 300 | 60.7 | 3 citrate/1 Mg | 12 |
| 600 | 27.6 | 3 citrate/1 Mg | 12 |
| 50 | 99.5 | citrate | 12 |
| 300 | 42.7 | citrate | 12 |
| 600 | 20 | citrate | 12 |
| 50 | 78.9 | Mg | 12 |
| 300 | 65.9 | Mg | 12 |
| 600 | 30.9 | Mg | 12 |
| Temperature: 50° C. | | | |
| 50 | 99.0 | 3 citrate/1 Mg | 8 |
| 300 | 100 | 3 citrate/1 Mg | 8 |
| 600 | 95.7 | 3 citrate/1 Mg | 8 |
| 50 | 99.1 | citrate | 8 |
| 300 | 64.2 | citrate | 8 |
| 600 | 91.1 | citrate | 8 |
| 50 | 96.2 | Mg | 8 |
| 300 | 92.3 | Mg | 8 |
| 600 | 55.8 | Mg | 8 |
| 50 | 100.0 | 3 citrate/1 Mg | 10 |
| 300 | 87 | 3 citrate/1 Mg | 10 |
| 600 | 69.1 | 3 citrate/1 Mg | 10 |
| 50 | 95.8 | citrate | 10 |
| 300 | 50.9 | citrate | 10 |
| 600 | 68.5 | citrate | 10 |
| 50 | 96.5 | Mg | 10 |
| 300 | 81.1 | Mg | 10 |
| 600 | 35.4 | Mg | 10 |
| 50 | 98.3 | 3 citrate/1 Mg | 12 |
| 300 | 31.9 | 3 citrate/1 Mg | 12 |
| 600 | 24.2 | 3 citrate/1 Mg | 12 |
| 50 | 97.4 | citrate | 12 |
| 300 | 37.3 | citrate | 12 |
| 600 | 17.5 | citrate | 12 |
| 50 | 69.0 | Mg | 12 |
| 300 | 57.6 | Mg | 12 |
| 600 | 27.6 | Mg | 12 |
| Temperature: 70° C. | | | |
| 50 | 98.1 | 3 citrate/1 Mg | 8 |
| 300 | 99.8 | 3 citrate/1 Mg | 8 |
| 600 | 96.4 | 3 citrate/1 Mg | 8 |
| 50 | 99.0 | citrate | 8 |
| 300 | 50.6 | citrate | 8 |
| 600 | 91.1 | citrate | 8 |
| 50 | 96.3 | Mg | 8 |
| 300 | 92.3 | Mg | 8 |
| 600 | 50.9 | Mg | 8 |
| 50 | 99.1 | 3 citrate/1 Mg | 10 |
| 300 | 60.8 | 3 citrate/1 Mg | 10 |
| 600 | 68.5 | 3 citrate/1 Mg | 10 |
| 50 | 95.5 | citrate | 10 |
| 300 | 35.2 | citrate | 10 |
| 600 | 68 | citrate | 10 |
| 50 | 86.1 | Mg | 10 |
| 300 | 72.4 | Mg | 10 |
| 600 | 38.1 | Mg | 10 |
| 50 | 96.3 | 3 citrate/1 Mg | 12 |
| 300 | 27.3 | 3 citrate/1 Mg | 12 |
| 600 | 22.7 | 3 citrate/1 Mg | 12 |
| 50 | 98.7 | citrate | 12 |
| 300 | 28.1 | citrate | 12 |
| 600 | 14.2 | citrate | 12 |
| 50 | 62.9 | Mg | 12 |
| 300 | 51.1 | Mg | 12 |
| 600 | 24.7 | Mg | 12 |

Figure 7:
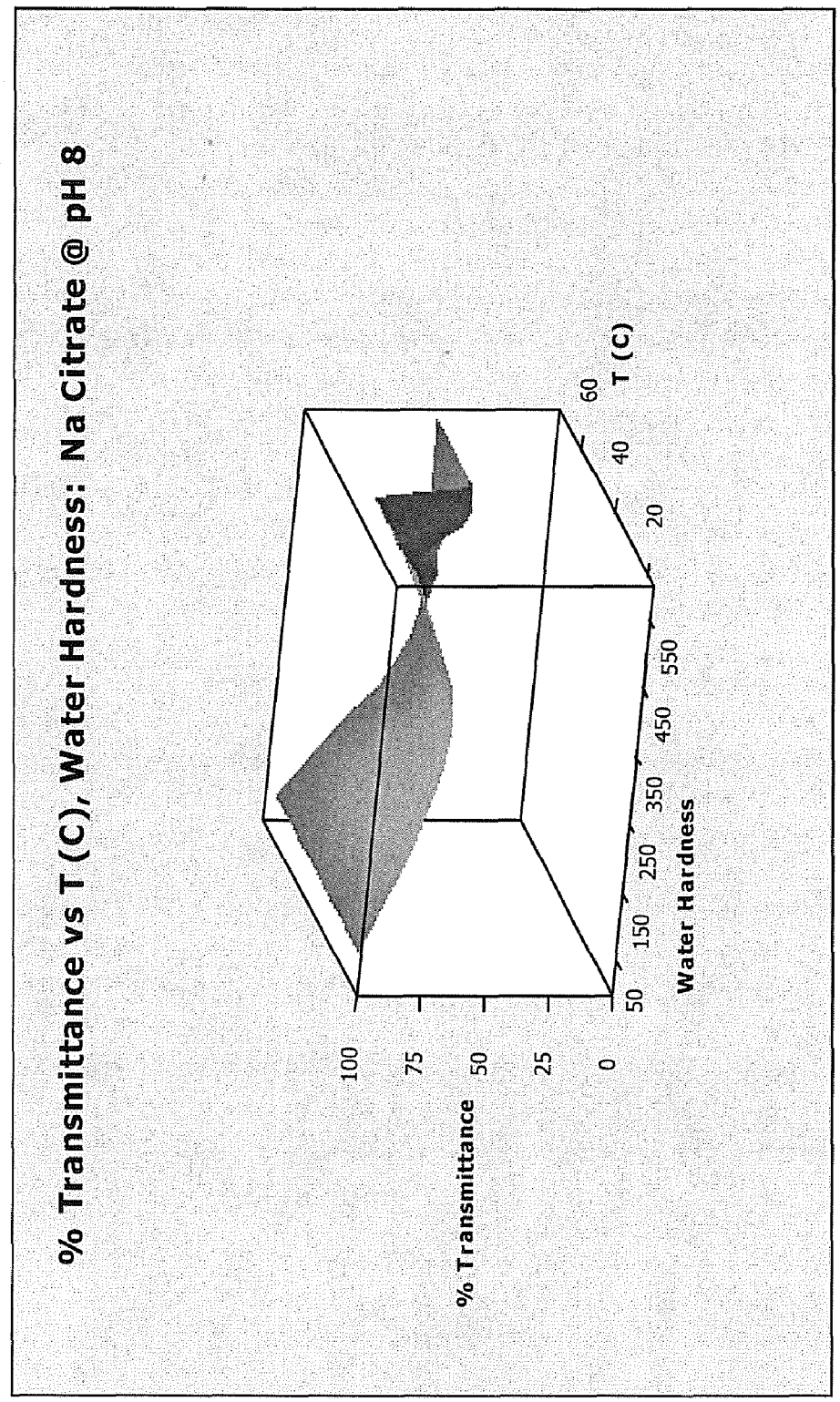
FIG. 7 is a plot of the performance of sodium citrate as a builder in the presence of various levels of calcium, at various temperatures, and at a constant pH of 8.

FIG. 7 is a plot of the performance of sodium citrate as a builder in the presence of various levels of calcium, at various temperatures, and at a constant pH of 8 and illustrating the impact of Ca/builder ratio and temperature on the building performance of STPP.

Figure 8:
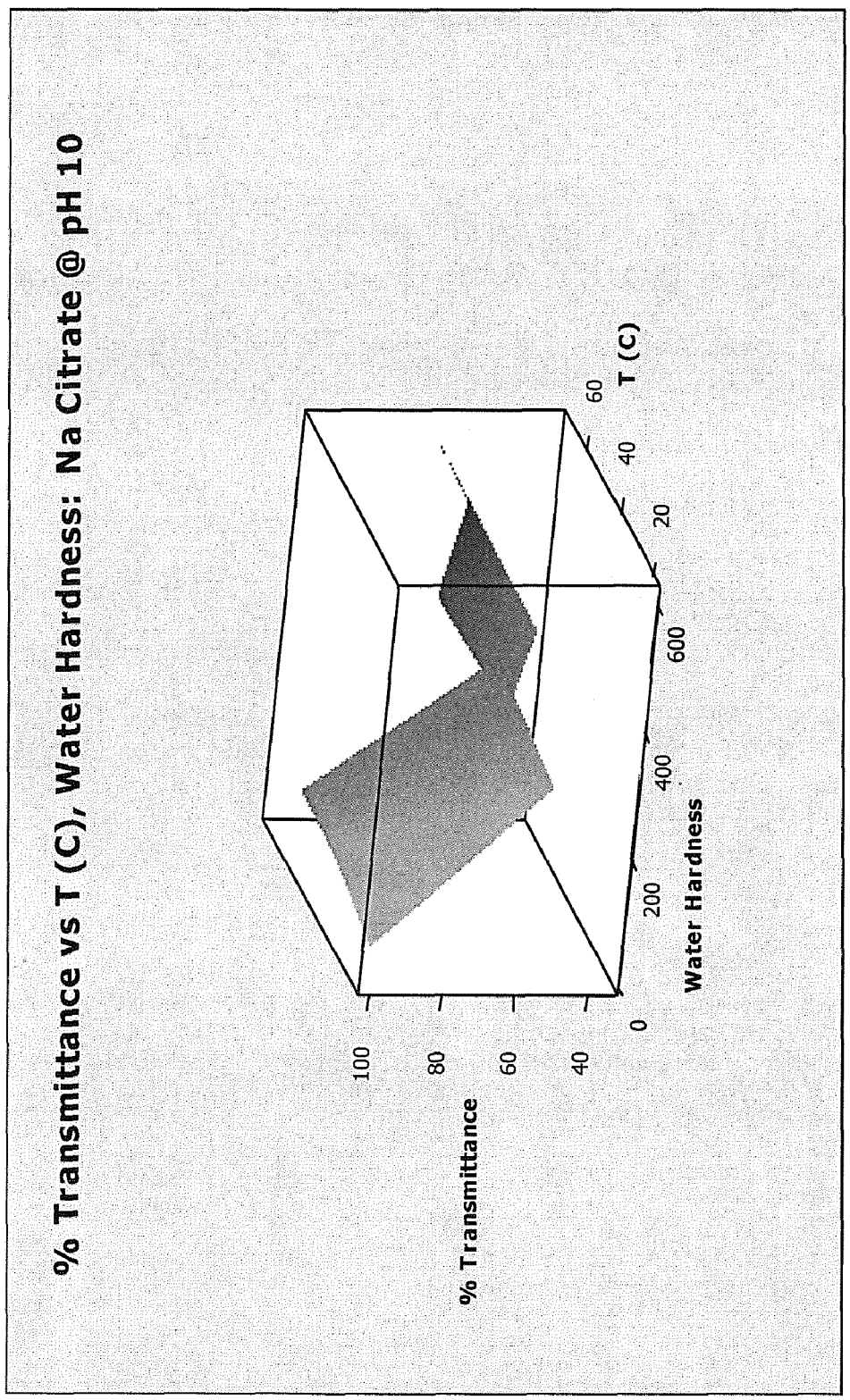
FIG. 8 is a plot of the performance of sodium citrate as a builder in the presence of various levels of calcium, at various temperatures, and at a constant pH of 10.

FIG. 8 is a plot of the performance of sodium citrate as a builder in the presence of various levels of calcium, at various temperatures, and at a constant pH of 10. A comparison of this graph with the results obtained at pH 8 (FIG. 7) shows that the increased alkalinity gives reduced building performance at elevated temperatures, particularly around 60° C.

Figure 9:
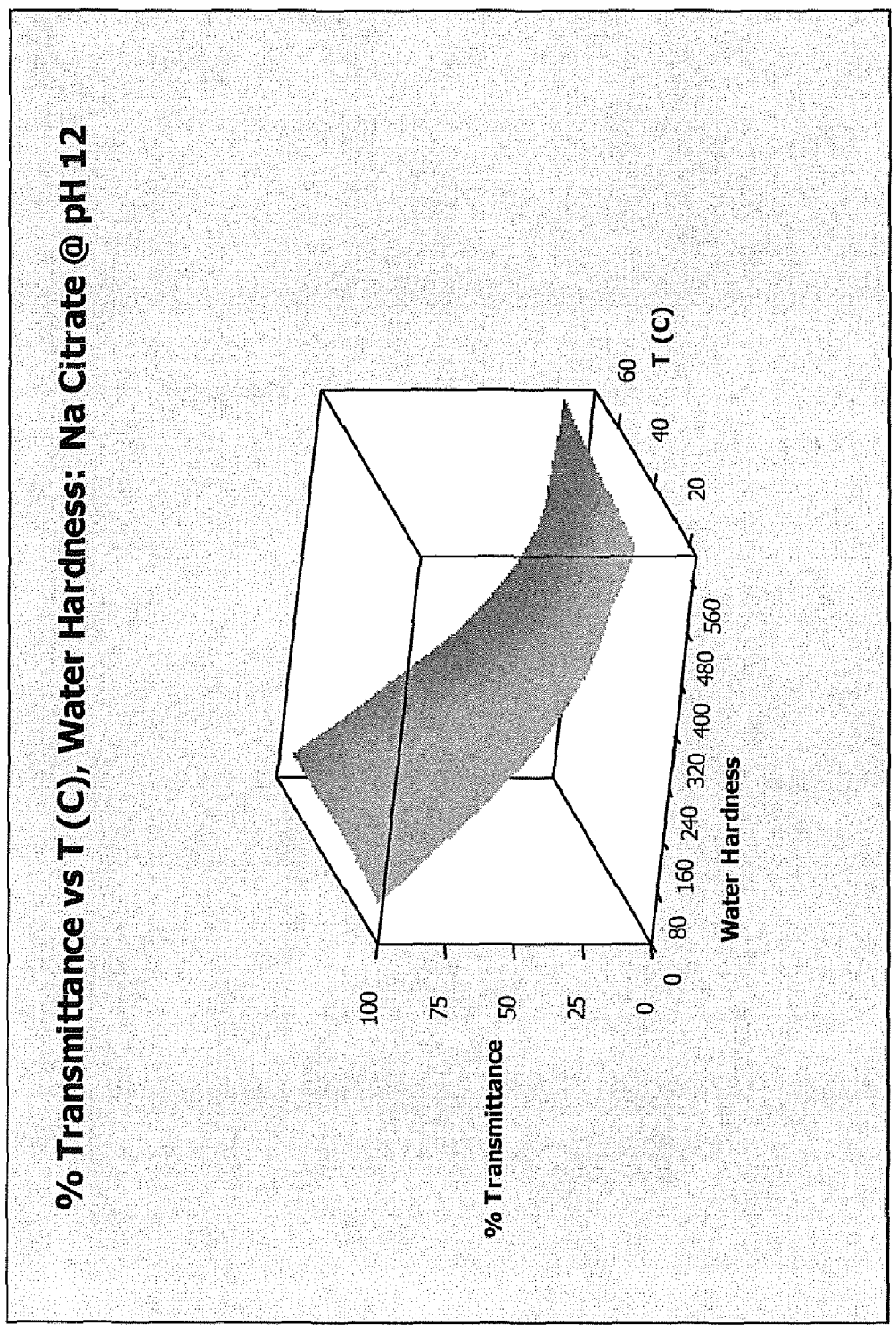
FIG. 9 is a plot of the performance of sodium citrate as a builder in the presence of various levels of calcium, at various temperatures, and at a constant pH of 12.

FIG. 9 is a plot of the performance of sodium citrate as a builder in the presence of various levels of calcium, at various temperatures, and at a constant pH of 12. This graph shows that sodium citrate is an effective builder under most conditions but is adversely affected by high pH and temperature. Once again elevated temperatures make the sodium citrate system more sensitive to water hardness.

Figure 10:
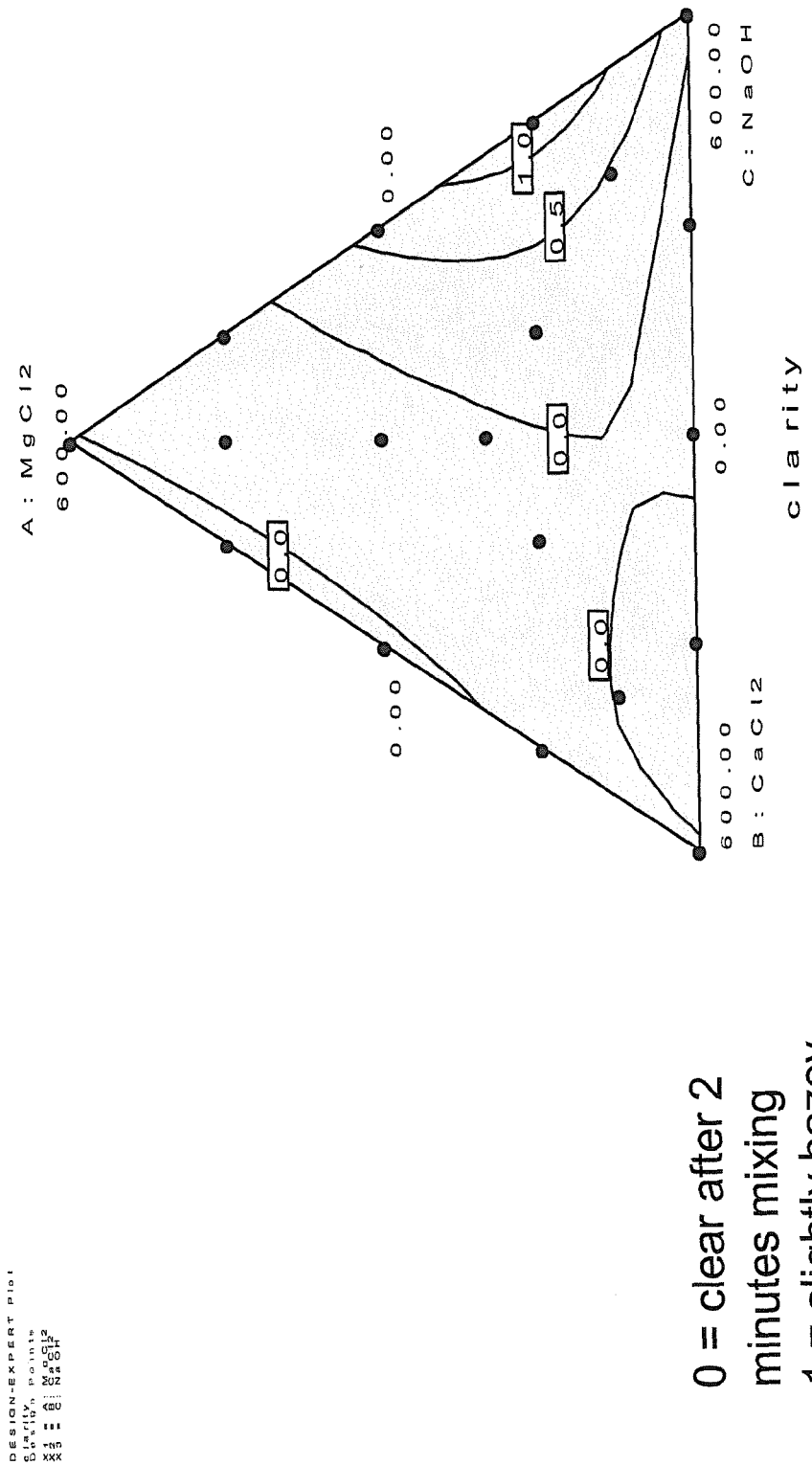
FIG. 10 illustrates the results of experiments conducted to determine the impact of a water soluble alkali metal hydroxide such as sodium hydroxide on the precipitation of water hardness ions (e.g., $Ca^{2+}$ and $Mg^{2+}$).
Figure 11:
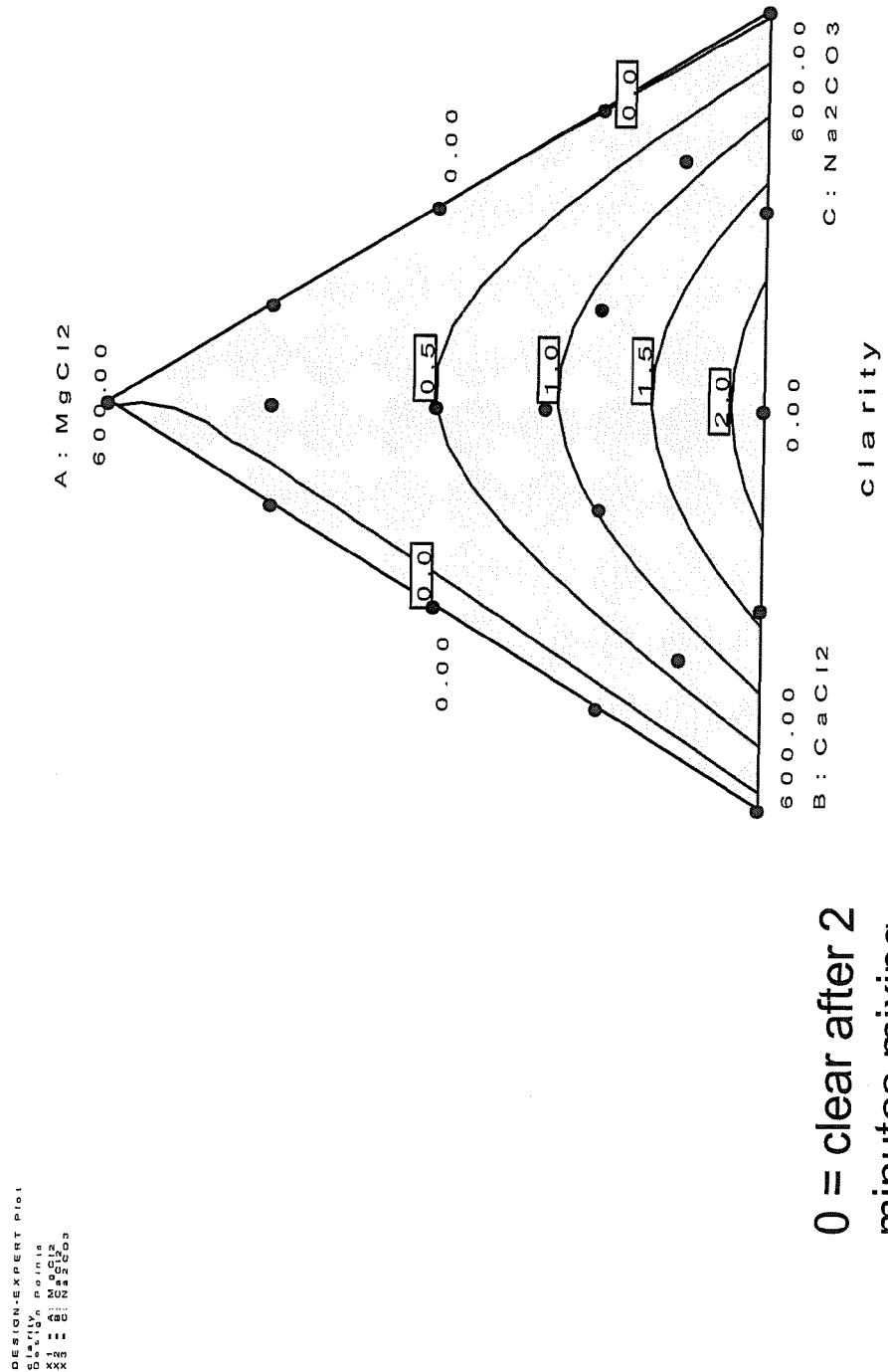
FIG. 11 illustrates the results of experiments conducted to determine the impact of a water soluble alkali metal carbonate such as sodium carbonate on the precipitation of water hardness ions (e.g., $Ca^{2+}$ and $Mg^{2+}$).
Figure 12:
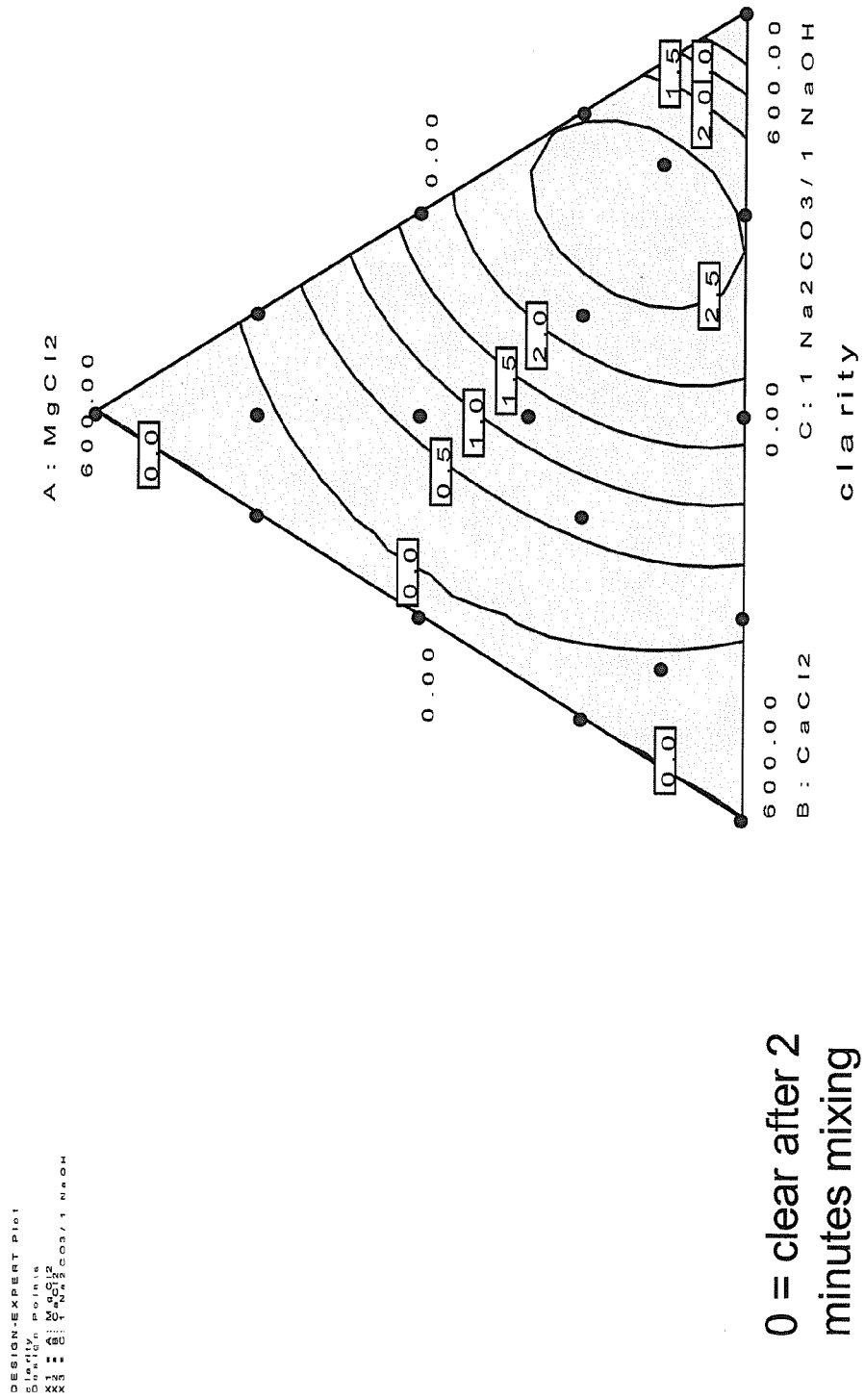
FIG. 12 illustrates the results of experiments conducted to determine the impact of a water soluble alkali metal hydroxide such as sodium hydroxide and a water soluble alkali metal carbonate such as sodium carbonate on the precipitation of water hardness ions (e.g., $Ca^{2+}$ and $Mg^{2+}$).

FIGS. 10-12 illustrate the results of experiments conducted to determine the level of calcium precipitation in the presence of MgCl$_2$ when the composition also included calcium chloride, sodium hydroxide, or sodium carbonate.

FIG. 10 illustrates the results of experiments conducted to determine the impact of a water soluble alkali metal hydroxide such as sodium hydroxide on the precipitation of water hardness ions (e.g., Ca$^{2+}$ and Mg$^{2+}$). Table 13 shows the component compositions and clarity grade for each composition.

TABLE 13

| MgCl$_2$ (ppm) | CaCl$_2$ (ppm) | NaOH (ppm) | clarity |
|---|---|---|---|
| 600.00 | 0.00 | 0.00 | 0.0 |
| 450.00 | 150.00 | 0.00 | 0.0 |
| 300.00 | 300.00 | 0.00 | 0.0 |
| 150.00 | 450.00 | 0.00 | 0.0 |
| 0.00 | 600.00 | 0.00 | 0.0 |
| 0.00 | 0.00 | 600.00 | 0.0 |
| 150.00 | 0.00 | 450.00 | 2.0 |
| 300.00 | 0.00 | 300.00 | 0.0 |
| 450.00 | 0.00 | 150.00 | 0.0 |
| 0.00 | 150.00 | 450.00 | 0.0 |
| 0.00 | 300.00 | 300.00 | 0.0 |
| 0.00 | 450.00 | 150.00 | 0.0 |
| 300.00 | 150.00 | 150.00 | 0.0 |
| 150.00 | 300.00 | 150.00 | 0.0 |
| 150.00 | 150.00 | 300.00 | 0.0 |
| 450.00 | 75.00 | 75.00 | 0.0 |
| 75.00 | 450.00 | 75.00 | 0.0 |
| 75.00 | 75.00 | 450.00 | 0.0 |
| 200.00 | 200.00 | 200.00 | 0.0 |

FIG. 10 shows a ternary graph illustrating clarity as a function of the concentrations of water soluble magnesium salt (e.g., MgCl2), water soluble calcium salt (e.g., CaCl2), and source of alkalinity (e.g., sodium hydroxide). The ternary graph was produced by entering the data from Table 1.10 into a statistical program, Design Expert, version 6.0.11, available from Stat Ease, Minneapolis, Minn. The graph shows that the presence of sodium hydroxide did not cause significant precipitation of water hardness ions under the test conditions.

FIG. 11 illustrates the results of experiments conducted to determine the impact of a water soluble alkali metal carbonate such as sodium carbonate on the precipitation of water hardness ions (e.g., Ca$^{2+}$ and Mg$^{2+}$). Table 14 shows the component compositions and clarity grade for each composition.

TABLE 14

| MgCl$_2$ (ppm) | CaCl$_2$ (ppm) | Na$_2$CO$_3$ (ppm) | clarity |
|---|---|---|---|
| 600.00 | 0.00 | 0.00 | 0.0 |
| 450.00 | 150.00 | 0.00 | 0.0 |
| 300.00 | 300.00 | 0.00 | 0.0 |
| 150.00 | 450.00 | 0.00 | 0.0 |
| 0.00 | 600.00 | 0.00 | 0.0 |
| 0.00 | 0.00 | 600.00 | 0.0 |
| 150.00 | 0.00 | 450.00 | 0.0 |
| 300.00 | 0.00 | 300.00 | 0.0 |
| 450.00 | 0.00 | 150.00 | 0.0 |
| 0.00 | 150.00 | 450.00 | 2.0 |
| 0.00 | 300.00 | 300.00 | 2.0 |
| 0.00 | 450.00 | 150.00 | 2.0 |
| 300.00 | 150.00 | 150.00 | 0.0 |
| 150.00 | 300.00 | 150.00 | 0.0 |
| 150.00 | 150.00 | 300.00 | 2.0 |
| 450.00 | 75.00 | 75.00 | 0.0 |
| 75.00 | 450.00 | 75.00 | 0.0 |
| 75.00 | 75.00 | 450.00 | 0.0 |
| 200.00 | 200.00 | 200.00 | 2.0 |

FIG. 11 shows a ternary graph illustrating clarity as a function of the concentrations of water soluble magnesium salt (e.g., MgCl2), water soluble calcium salt (e.g., CaCl2), and source of alkalinity (e.g. sodium carbonate). The ternary graph was produced by entering the data from Table 14 into a statistical program, Design Expert, version 6.0.11, available from Stat Ease, Minneapolis, Minn. The graph shows that the presence of sodium carbonate caused significant precipitation under the conditions of the test.

FIG. 12 illustrates the results of experiments conducted to determine the impact of a water soluble alkali metal hydroxide such as sodium hydroxide and a water soluble alkali metal carbonate such as sodium carbonate on the precipitation of water hardness ions (e.g., Ca$^{2+}$ and Mg$^{2+}$). Table 15 shows the component compositions and clarity grade for each composition.

TABLE 15

| MgCl$_2$ (ppm) | CaCl$_2$ (ppm) | Na$_2$CO$_3$/1 NaOH (ppm) | clarity |
|---|---|---|---|
| 600.00 | 0.00 | 0.00 | 0.0 |
| 450.00 | 150.00 | 0.00 | 0.0 |
| 300.00 | 300.00 | 0.00 | 0.0 |
| 150.00 | 450.00 | 0.00 | 0.0 |
| 0.00 | 600.00 | 0.00 | 0.0 |
| 0.00 | 0.00 | 600.00 | 0.0 |
| 150.00 | 0.00 | 450.00 | 2.0 |
| 300.00 | 0.00 | 300.00 | 2.0 |
| 450.00 | 0.00 | 150.00 | 0.0 |
| 0.00 | 150.00 | 450.00 | 2.0 |
| 0.00 | 300.00 | 300.00 | 2.0 |
| 0.00 | 450.00 | 150.00 | 0.0 |
| 300.00 | 150.00 | 150.00 | 1.0 |
| 150.00 | 300.00 | 150.00 | 1.0 |
| 150.00 | 150.00 | 300.00 | 3.0 |
| 450.00 | 75.00 | 75.00 | 0.0 |
| 75.00 | 450.00 | 75.00 | 0.0 |
| 75.00 | 75.00 | 450.00 | 3.0 |
| 200.00 | 200.00 | 200.00 | 0.0 |

FIG. 12 shows a ternary graph illustrating clarity as a function of the concentrations of water soluble magnesium salt (e.g., MgCl$_2$), water soluble calcium salt (e.g., CaCl$_2$), and source of alkalinity (e.g. sodium carbonate and sodium hydroxide). The ternary graph was produced by entering the data from Table 15 into a statistical program, Design Expert, version 6.0.11, available from Stat Ease, Minneapolis, Minn. The graph shows that the presence of sodium carbonate caused significant precipitation under the conditions of the test.

Comparing FIG. 12 to FIGS. 10 and 11 indicates that the presence of a combination of water soluble alkali metal hydroxide plus water soluble alkali metal carbonate was unexpectedly worse than either alkalinity source alone in causing water hardness ions to precipitate.

As can be seen in FIGS. 1-9, magnesium chloride matched or exceeded the ability of STPP to soften water under most conditions. By matched or exceeded the ability we mean that the magnesium chloride reduced scale (as reflected by percent transmittance) to a level comparable to or lower than that achieved with STPP, e.g., for most molar ratios of calcium and builder. In particular, the performance of magnesium chloride at pH values of 8 and 10 exceeded the performance of STPP at all temperature values.

At a pH value of 12, magnesium chloride started at about 80% transmittance, but had a lower slope compared to STPP. The lower slope indicates better control of water hardness precipitation as the ratio of calcium/builder increased.

The results of experiments conducted to determine the level of calcium precipitation in the presence of MgCl$_2$ when the composition also included calcium chloride, sodium hydroxide, or sodium carbonate are illustrated in FIGS. 10-12. These Figures show that magnesium compounds (e.g., MgCl$_2$) acted in a synergistic manner with chelating hydroxyacids and their salts. In particular, these ternary graphs that MgCl$_2$ prevented calcium from precipitating out and provided a synergistic effect in reducing hard water precipitation when combined with another builder. Synergy in these graphs appears as points having a greater transmittance than that expected from the weighted arithmatic average of the individual components.

Comparing FIG. 12 to FIGS. 10 and 11 shows that the ratio where the moles Mg≧moles Ca, which corresponds roughly to about 0.5 Mg compound≧Ca compound by weight, and with at least 70% alkalinity (as sodium carbonate) was the area of worst precipitation of hard water where the alkalinity is a mixture of sodium carbonate and sodium hydroxide. In the mixed alkalinity system, the ratio of Mg to Ca did not markedly affect the results as long as both were present. The greater effect on preventing or reducing precipitation in the presence of water hardness was that the ratio of the sum of (Mg+Ca) by weight was about $1/3^{rd}$ or less than the total amount of combined alkalinity.

Example 2

Soluble Magnesium Salt Including Anion of Soluble Calcium Salt Reduced Formation of Scale from Hard Water in Warewashing at Lower Ratios Surprisingly, a water soluble magnesium salt ($MgCl_2$) providing an anion that forms a water soluble calcium salt reduced formation of lime scale from hard water at lower ratios of $Mg^{2+}$ to $Ca^{2+}$ than a magnesium salt ($MgSO_4$) providing an anion of a water insoluble calcium salt.

A first glass and a second glass were run though a dishwashing machine for 100 cycles using 17 grain hard water in a dishwashing machine with water soluble magnesium compound, magnesium chloride or magnesium sulfate, introduced as the sole rinse agent. The water soluble magnesium compounds were introduced at molar ratios of magnesium ion to calcium ion of 1:1. No detergent was used in any of the wash cycles.

Figure 13:
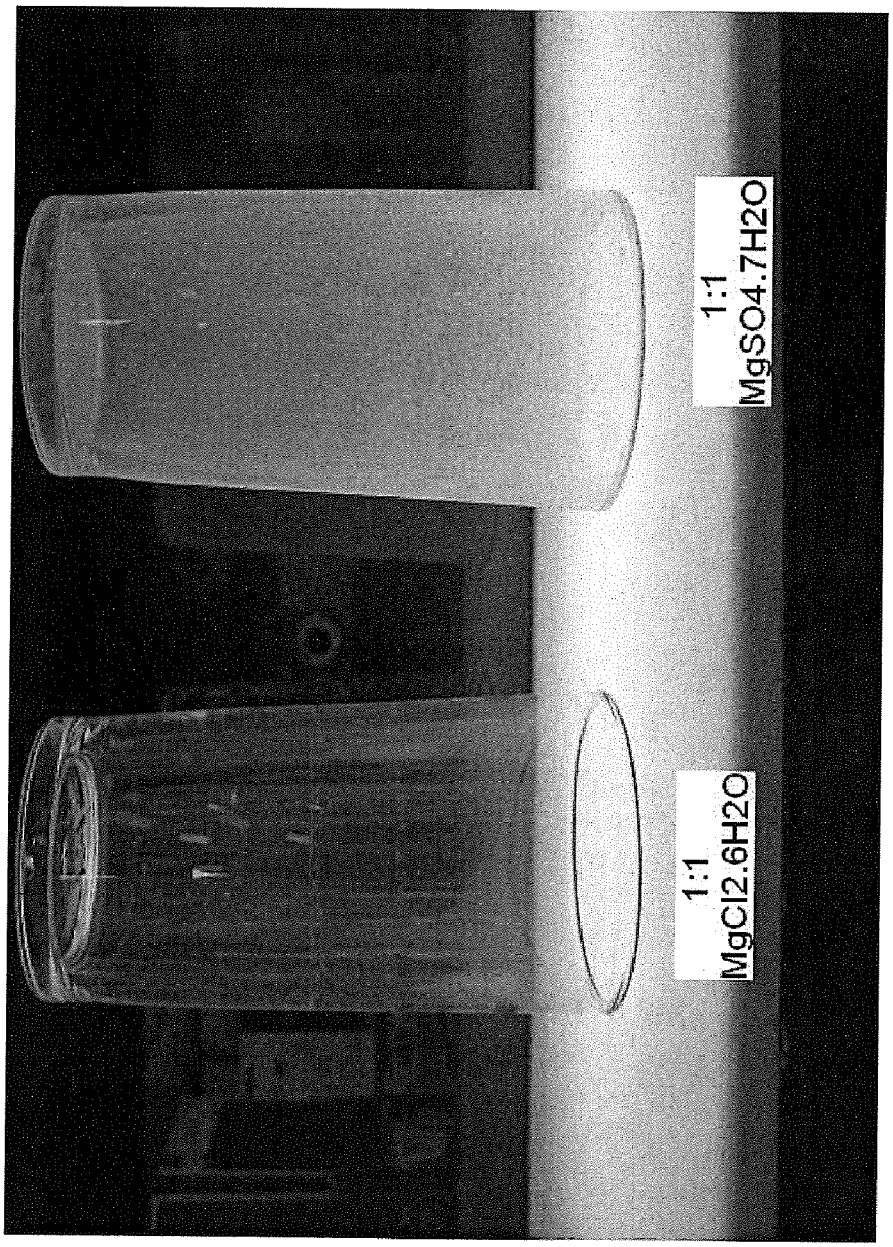
FIG. 13 is a photograph of two glasses, one subjected to 100 cycles in a dishwashing machine with magnesium chloride and the other with magnesium sulfate. The molar ratio of magnesium to calcium was 1:1.

The results in FIG. 13 compare glasses rinsed with two sources of water soluble magnesium compound as the source of the added magnesium ion. Magnesium chloride and calcium chloride are both soluble. However, magnesium sulfate is soluble but calcium sulfate is only slightly soluble. The water solubility's of different magnesium compounds are shown in Table 16.

TABLE 16

| Compound | Water Solubility (20° C.) |
| --- | --- |
| magnesium chloride | 54.6 |
| magnesium sulfate | 33.7 |
| calcium chloride | 42.0 |
| calcium sulfate | 0.2 |

Interestingly, magnesium chloride effectively reduced formation of lime scale from hard water at a lower concentration than magnesium sulfate.

A magnesium compound such as magnesium chloride where the analogous calcium salt is water soluble was found to be more effective in preventing hard water scale than one where the analogous calcium salt is water insoluble. FIG. 13 illustrates this at a 1:1 molar ratio of total magnesium ion to calcium ion for both salts.

Example 3

Cleaning Composition Containing Water Soluble Magnesium Salt Removed Protein Soil in Warewashing Surprisingly, adding a hardness ion ($Mg^{2+}$) to a phosphorus-free warewashing composition resulted in equal or better cleaning performance compared to a conventional, magnesium salt free, phosphorus containing warewash detergent.

A first glass (H) was soiled with milk and washed with 1000 ppm of Formula A at 160° F. in 17 gpg hard water. A second glass (I) was soiled with milk and washed with 1000 ppm of a comparable, conventional warewash detergent at 160° F. in 17 grain hard water. The soiling and wash sequence was repeated 10 times for each glass.

The glasses were then treated with Comassie Blue dye, which stains protein blue. The intensity of blue color on the treated glasses was directly proportional to the level of protein (i.e., milk) remaining on the surface. The glasses were filled with a white powder (to provide greater contrast for the blue color), visually inspected, and photographed.

| Formula A | |
| --- | --- |
| Ingredient | Wt-% |
| sodium hydroxide | 48 |
| water | 14 |
| zinc chloride, 62.5% | 0.2 |
| sodium aluminate, 45% | 0.2 |
| ethoxy-propoxy copolymer | 1 |
| maleic-acrylate copolymer | 2 |
| sodium polyacrylate dispersant | 4 |
| sodium sulfate | 11 |
| magnesium chloride | 10 |
| sodium citrate | 10 |

In a second experiment, a first side (J) of a coffee cup heavily soiled with coffee and creamer (which contains protein) was placed in a 1000 ppm solution of a warewash detergent in 17 grain hard water for 30 seconds at ambient temperature. A second side (K) of the coffee cup was soaked in a 1000 ppm solution of Formula A in 17 grain hard water for 30 seconds at ambient temperature. A portion of the cup between the two sides, was not treated with detergent. The cup was not stained with Comassie Blue dye. The cup was visually inspected and photographed.

Figure 14:
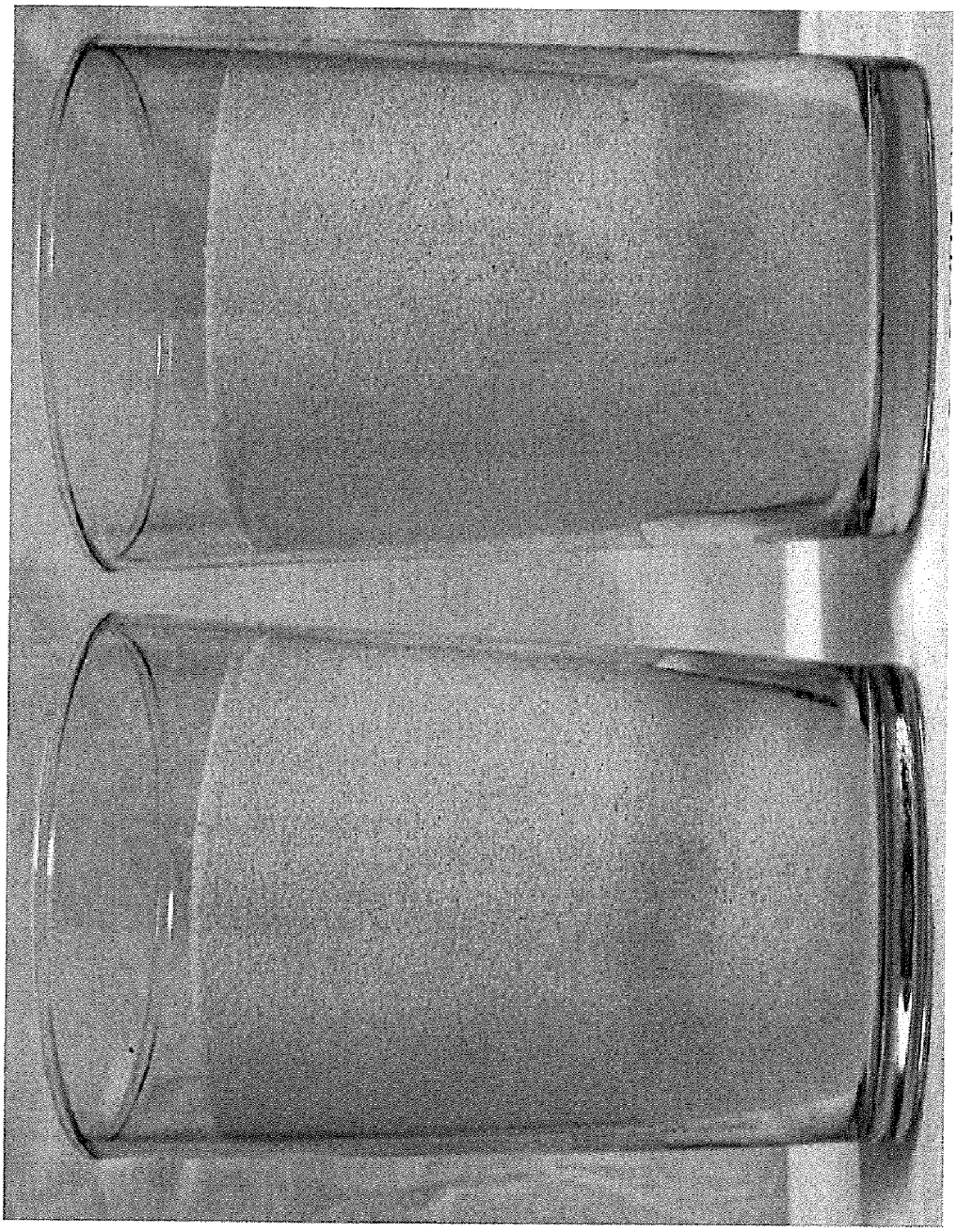
FIG. 14 shows a photograph of two glasses. The glass on the left was washed using a conventional, magnesium free warewash detergent. The glass on the right was washed using magnesium salt containing Formula A. There is a darker vertical stripe of dye visible on the glass on the left.

FIG. 14 shows the photograph of the two glasses. The glass washed using the conventional, magnesium free warewash detergent is on the left and the glass washed using magnesium salt containing Formula A is on the right. As shown in FIG. 14, there is a darker vertical stripe of dye visible on the lower portion of the glass on the left. The magnesium salt containing, phosphorus-free detergent did not have such a stripe. Thus it was determined that the compositions of the present invention removed more protein than magnesium salt free, phosphorus containing, conventional warewash detergent.

Figure 15:
FIG. 15 shows a photograph of a cup. The left side of the cup was washed using the conventional, magnesium free warewash detergent. The right side of the cup washed using magnesium salt containing Formula A. The two sides of the cup appear equally clean.

FIG. 15 shows a photograph of the cup. The left side of the cup was washed using the conventional, magnesium free warewash detergent. The right side of the cup washed using magnesium salt containing Formula A. As shown in FIG. 15, the two sides of the cup appear equally clean. The magnesium salt containing, phosphorus-free detergent cleaned as well as the magnesium salt free, phosphorus containing, conventional warewash detergent.

Example 4

Warewashing or Rinsing with Water Containing Water Soluble Magnesium Compound Reduced Formation of Scale from Hard Water Surprisingly, adding a hardness ion ($Mg^{2+}$) to rinse water reduced formation of scale from hard water on glasses after warewashing.

A first glass and a second glass were repeatedly washed (100 cycles) with a warewash detergent (1000 ppm). The first glass was washed with a warewash detergent (Formula A, Example 3) containing magnesium chloride in water of 17 grain per gallon (gpg) water hardness and rinsed with water of 17 grain hardness, which corresponds to about 300 ppm Ca calculated as $CaCO_3$ and about 100 ppm Mg calculated as $CaCO_3$. The second glass was washed with a warewash detergent (Formula A) containing magnesium chloride in 5 gpg water hardness and rinsed with water of 5 grain hardness also containing about 48 ppm magnesium ion. The rinse water did not contain any additive (e.g., rinse aid) beyond magnesium compound.

Figure 16:
FIG. 16 is a photograph showing two glasses washed with a warewash detergent and then rinsed as described in Example 4 and illustrating that adding a hardness ion ($Mg^{2+}$) to rinse water reduced formation of scale from hard water on glasses after warewashing.

After washing with warewash detergent, rinsing, and drying, the two glasses (FIG. 16) exhibited comparable clarity. Washing in 17 grain hard water followed by rinsing with water would normally be expected to yield glassware with more spotting than in softer water (left glass in FIG. 16). Washing in 5 grain hard water followed by rinsing with water typically yields clear glassware, and this is confirmed by FIG. 16 (right glass). In this experiment, washing with a detergent containing magnesium chloride and/or rinsing with water containing magnesium ion reduced or eliminated the cloudiness typically observed when using hard water, e.g., 17 grain hard water. Low levels of magnesium ions were effective in reducing scale build-up at various levels of water hardness.

Example 5

Cleaning Composition Containing Water Soluble Magnesium Salt Removed Soil from Hard Surface without Spotting Surprisingly, adding a hardness ion ($Mg^{2+}$) to a surfactant resulted in a hard surface cleaner with reduced spotting from cleaning with hard water.

A shower cleaner was prepared containing 0.1% of a reverse EO-PO copolymer as a sheeting agent and 0.005% magnesium chloride for scale control. Half of a black ceramic tile was cleaned with the magnesium salt containing hard surface cleaner. A portion of the remaining half was cleaned with the same composition lacking magnesium salt, that is, 0.1% of the reverse EO-PO copolymer. Another portion of that remaining half was left untreated. The tile was then rinsed with 17 grain hard water and allowed to air dry. The tile was visually inspected for water spotting.

No water spotting was observed on the side treated with the hard surface cleaner containing magnesium salt. Numerous water spots were seen on the portion cleaned with the conventional cleaner (i.e., surfactant) and the uncleaned portion of the tile.

Example 6

Water Soluble Magnesium Compound Reduced Streaking by Glass Cleaner

Surprisingly, glass cleaner containing a hardness ion ($Mg^{2+}$) cleaned glass with reduced streaking.

The commercial glass cleaner of Formula B was diluted 1:16 in 17 grain hard water and used to clean a window. At a 1:16 dilution, the glass cleaner of Formula B lacks sufficient builder to counter 17 grain hard water. Another portion of the same window was cleaned with a 1:16 dilution of Formula B in which the use composition also contained 200 ppm magnesium chloride.

| Formula B | |
|---|---|
| Ingredient | wt-% |
| water | 73 |
| polycarboxylate, Sodium Salt | 1 |
| n-propoxypropanol | 18 |
| monoethanolamine | 1.9 |
| propoxy-ethoxy copolymer | 0.10 |
| sodium lauryl sulfate 30%, | 4.9 |
| citric acid, 50% | 0.10 |
| tetrasodium EDTA, 40% | 1.0 |
| dye | 0.05 |
| fragrance | 0.10 |

It was observed that streaking on the glass was greatly reduced with the addition of the water soluble magnesium salt to the formula.

Example 7

Use of a Water Soluble Magnesium Compound in a Builder Free Detergent Composition A ten cycle test was run to determine the effectiveness of a known conventional cleaning composition comprising a builder, i.e., Solid Power®, commercially available from Ecolab Inc., when the builder was replaced with a water soluble magnesium salt, e.g., $MgCl_2$. Evaluation included washing glasses soiled with milk/grease with a water temperature of 160° F.

All of the washed glasses were visually scored for spotting and also for residual soil film with "1" being a perfectly clean glass and "5" totally covered by the spots or residual soil film. The following table summarizes the glass grading scale.

TABLE 17

| Rating | Spots | Film |
|---|---|---|
| 1 | No spots | No film |
| 2 | ¼ glass spotted | Trace/barely perceptible |
| 3 | ½ glass spotted | Slight film |
| 4 | ¾ glass spotted | Moderate film |
| 5 | Whole glass spotted | Heavy film |

The results are shown in the table below. The conventional cleaning composition was also used as a control.

TABLE 8

|  | Water Hardness (grains) | Type of Test Score | Soiled Glasses for Soil Removal Measurement | Clean Glasses for Soil Redeposit Measurement | Use Solution pH at 1200 ppm |
|---|---|---|---|---|---|
| Solid Power(control), 1200 ppm | 17 | Spots Film | 4.8 2.9 | 5.0 2.0 | 12.04 |
| 1200 ppm Solid Power w/ 300 ppm MgCl$_2$ | 17 | Spots Film | 3.8 3.1 | 4.2 2.8 | 11.19 |
| 1200 ppm Solid Power w/ 150 ppm MgCl$_2$ | 17 | Spots Film | 3.3 2.7 | 2.8 2.0 | 11.36 |

As can be seen in this table, the composition comprising a water soluble magnesium compound instead of a traditional builder achieved equal if not greater results in cleaning than the conventional detergent comprising a builder.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the term "configured" describes a system, apparatus, or other structure that is constructed or configured to perform a particular task or adopt a particular configuration. The term "configured" can be used interchangeably with other similar phrases such as arranged and configured, constructed and arranged, adapted and configured, adapted, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The invention has been described with reference to various specific and preferred embodiments and techniques. However, it should be understood that many variations and modifications may be made while remaining within the spirit and scope of the invention.

We claim:

1. A method of cleaning a hard surface comprising:
   contacting the hard surface with an aqueous composition comprising water comprising a calcium ion, a water soluble magnesium salt, at least about 5 wt % to less than about 60 wt % of a source of alkalinity, and about 0 wt % to about 20 wt % surfactant, wherein the aqueous composition during contacting comprises magnesium ion in a molar amount equal to or in excess over a molar amount of said calcium ion, and wherein the composition is substantially free of a builder and a phosphate or phosphate containing compound; and
   achieving said hard surface with an acceptable amount of hard water spotting, wherein the acceptable amount of hard water spotting comprises up to about one quarter of the surface containing spots.

2. The method of claim 1, wherein the hard surface is selected from the group consisting of ceramic tile, a window, a kitchen surface, ware, medical instrument, vehicle, and bathroom surface.

3. The method of claim 1, wherein the water soluble magnesium salt comprises an anion that forms a soluble calcium salt.

4. The method of claim 1, wherein:
   the water soluble magnesium salt comprises an anion that forms a sparingly soluble calcium salt; and
   the aqueous composition during contacting comprises said magnesium ion in a molar amount equal to or greater than two-times the molar amount of said calcium ion.

5. The method of claim 1, wherein the aqueous composition during contacting comprises said magnesium ion at a molar ratio of magnesium to calcium greater than or equal to one.

6. The method of claim 1, wherein the hard surface is selected from the group consisting of floors, counters, glass, and walls.

7. The method of claim 1, wherein the source of alkalinity is selected from the group consisting of an alkali metal carbonate, an alkali metal hydroxide, and combinations thereof.

8. The method of claim 1, wherein the surfactant is selected from the group consisting of nonionic surfactants, cationic surfactants, anionic surfactants, amphoteric surfactants, and combinations thereof.

9. The method of claim 3, wherein the water soluble magnesium salt is selected from the group consisting of magnesium acetate, magnesium benzoate, magnesium bromide, magnesium bromate, magnesium chlorate, magnesium chloride, magnesium chromate, magnesium citrate, magnesium formate, magnesium hexafluorosilicate, magnesium iodate, magnesium iodide, magnesium lactate, magnesium molybdate, magnesium nitrate, magnesium perchlorate, magnesium phosphinate, magnesium salicylate, magnesium sulfate, magnesium sulfite, magnesium thiosulfate, and hydrates and mixtures thereof.

10. The method of claim 7, wherein the alkali metal carbonate is selected from the group consisting of sodium carbonate, potassium carbonate, lithium carbonate, sodium bicarbonate, potassium bicarbonate, lithium bicarbonate, sodium sesquicarbonate, potassium sesquicarbonate, lithium sesquicarbonate, and combinations thereof.

11. The method of claim 7, wherein the alkali metal hydroxide is selected from the group consisting of sodium hydroxide, lithium hydroxide, potassium hydroxide, and combinations thereof.

* * * * *